United States Patent
Arnone et al.

[19]

[11] Patent Number: 5,886,839
[45] Date of Patent: Mar. 23, 1999

[54] TOY PERISCOPE MASK FOR PLAYING AQUATIC GAMES

[76] Inventors: Guido A. Arnone; Kirsten Schjoren, both of Guido Arnone c/o Roberto Belser 20 Seminole Cir., West Hartford, Conn. 06117

[21] Appl. No.: 851,636

[22] Filed: May 6, 1997

[51] Int. Cl.[6] .......................... G02B 23/08; G02B 23/22
[52] U.S. Cl. ........................................................ 359/857
[58] Field of Search .................................. 359/857, 858, 359/402; 351/43

[56] References Cited

U.S. PATENT DOCUMENTS

| | | | |
|---|---|---|---|
| 1,006,230 | 10/1911 | Kollmorgen . | |
| 3,084,687 | 4/1963 | Kallmeyer | 359/857 |
| 3,482,897 | 12/1969 | Hopp | 350/52 |
| 3,533,625 | 10/1970 | Kossor et al. | 273/120 |
| 3,582,077 | 6/1971 | Parker | 273/101.2 |
| 3,582,078 | 6/1971 | Karras | 273/102.4 |
| 3,652,090 | 3/1972 | Semmens | 273/104 |
| 3,843,127 | 10/1974 | Lack | 273/101 |
| 4,040,622 | 8/1977 | Sinnott | 273/86 R |
| 4,077,629 | 3/1978 | Chestney | 273/101 |
| 4,093,228 | 6/1978 | Pierce | 273/102.1 G |
| 4,132,028 | 1/1979 | Ogawa | 46/17 |
| 4,165,073 | 8/1979 | Kellerstrass | 273/101 |
| 4,173,394 | 11/1979 | Clave et al. | 350/181 |
| 4,174,836 | 11/1979 | Kearney | 273/101.2 |
| 4,250,877 | 2/1981 | Owens et al. | 128/207.11 |
| 4,276,851 | 7/1981 | Coleman | 114/331 |
| 4,375,913 | 3/1983 | Hajnal | 354/79 |
| 4,527,292 | 7/1985 | Kasama et al. | 2/452 |
| 4,743,030 | 5/1988 | Auer et al. | 273/349 |
| 4,763,988 | 8/1988 | Hamilton | 350/319 |
| 4,868,588 | 9/1989 | Hajnal | 354/79 |
| 4,887,893 | 12/1989 | Dahlgren | 350/618 |
| 4,890,767 | 1/1990 | Burlison | 222/78 |
| 4,934,246 | 6/1990 | Benson et al. | 89/36.14 |
| 5,011,161 | 4/1991 | Galphin | 273/349 |
| 5,074,437 | 12/1991 | D'Andrade | 222/79 |
| 5,141,462 | 8/1992 | Latzel | 446/28 |
| 5,299,809 | 4/1994 | Evangelista et al. | 273/380 |
| 5,344,357 | 9/1994 | Lyczek | 446/154 |
| 5,370,278 | 12/1994 | Raynie | 222/175 |
| 5,385,501 | 1/1995 | Fish | 446/154 |
| 5,393,068 | 2/1995 | Kane | 273/351 |
| 5,411,269 | 5/1995 | Thomas | 273/349 |
| 5,417,434 | 5/1995 | Romero | 273/350 |
| 5,420,649 | 5/1995 | Lewis | 351/43 |
| 5,421,585 | 6/1995 | Ruvio | 273/338 |
| 5,435,569 | 7/1995 | Zilliox | 273/349 |
| 5,514,023 | 5/1996 | Warner | 446/153 |
| 5,526,177 | 6/1996 | Fantone | 359/402 |
| 5,603,124 | 2/1997 | Garofalo | 2/428 |

FOREIGN PATENT DOCUMENTS

224L858   5/1958   Australia .............................. 359/857

*Primary Examiner*—Jon Henry

[57] ABSTRACT

A new aquatic toy comprises, an improved toy periscope (20) and a diving mask (110). The diving mask and the toy periscope can be either removably connected or integrally formed. The periscope comprises a top mirror (29), a bottom mirror (70), a slanted window (48), a V-shaped housing (22), and a plurality of suction cups (90) at a support top (84) located along the shortest arm thereof. The periscope housing further comprises suitable handles (95). When the suction cups are displaced along suitably positioned slits (89), the periscope can be coupled to substantially any mask. Thereby, the person using the periscope mask can see events above the water surface while his or her head is located substantially underwater. The upper housing (24) functions as an inlet opening for light rays and water shots to enter therein. A water receptacle (100) is attached to the upper housing so that, when it becomes full, water begins to cover the slanted window until the view is fully distorted. Alternatively, the receptacle may function as a water supply for suitable streaming means. When the underwater housing (56) is a closed structure, the periscope is partially submersible. Otherewise, the periscope is fully submersible. A slanted transparent window (48) and an external conduit (108B) connecting the upper housing to the underwater housing, allow suitable projectiles to progressively impair visibility in a staggered manner. The toy can be used in either destroyer or U-boat modes for sea battle games.

20 Claims, 12 Drawing Sheets

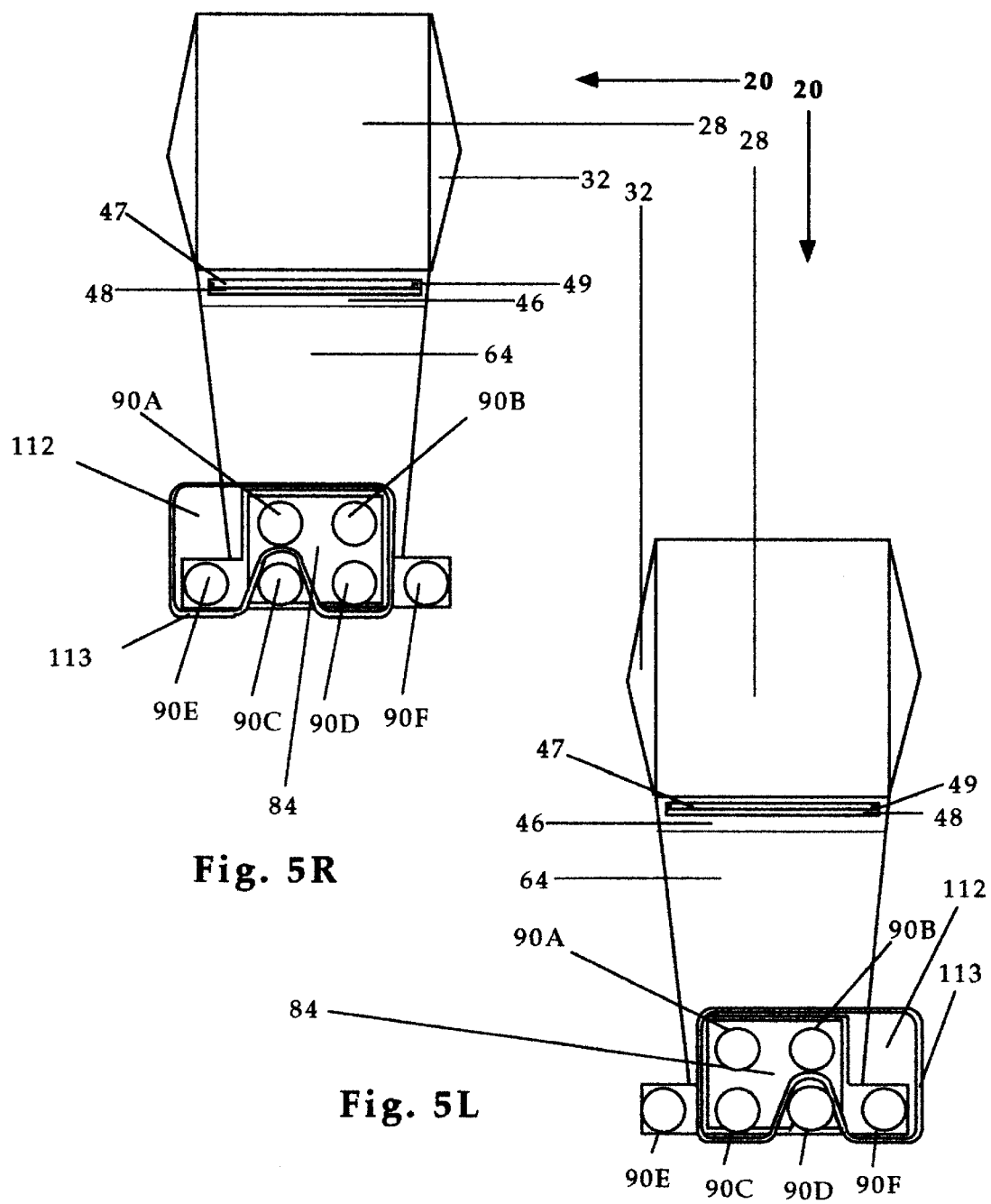

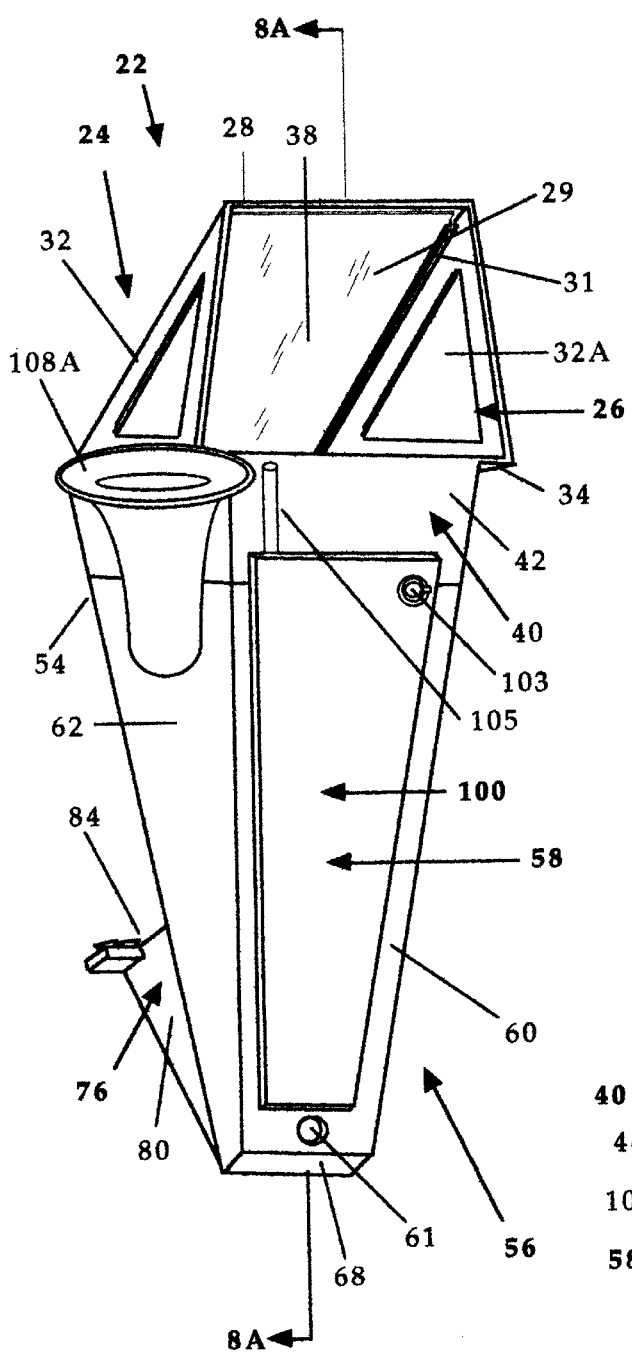
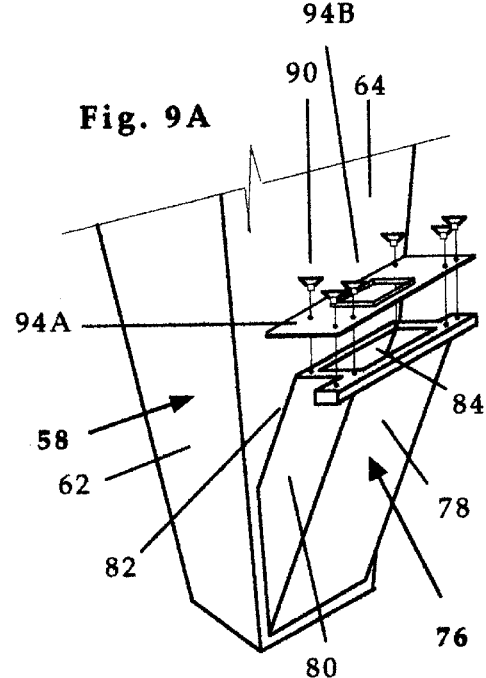
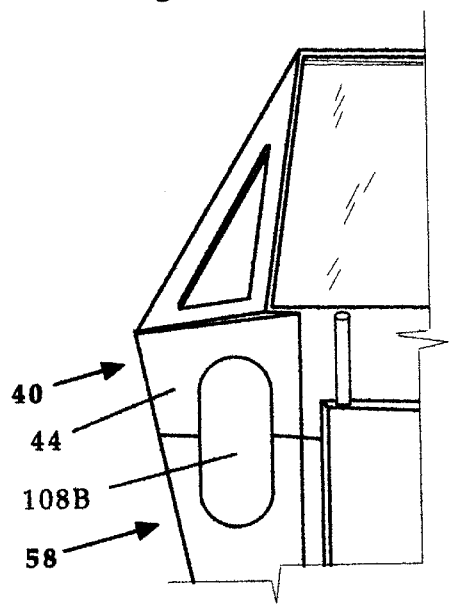
Fig. 8B
Fig. 9A
Fig. 8C

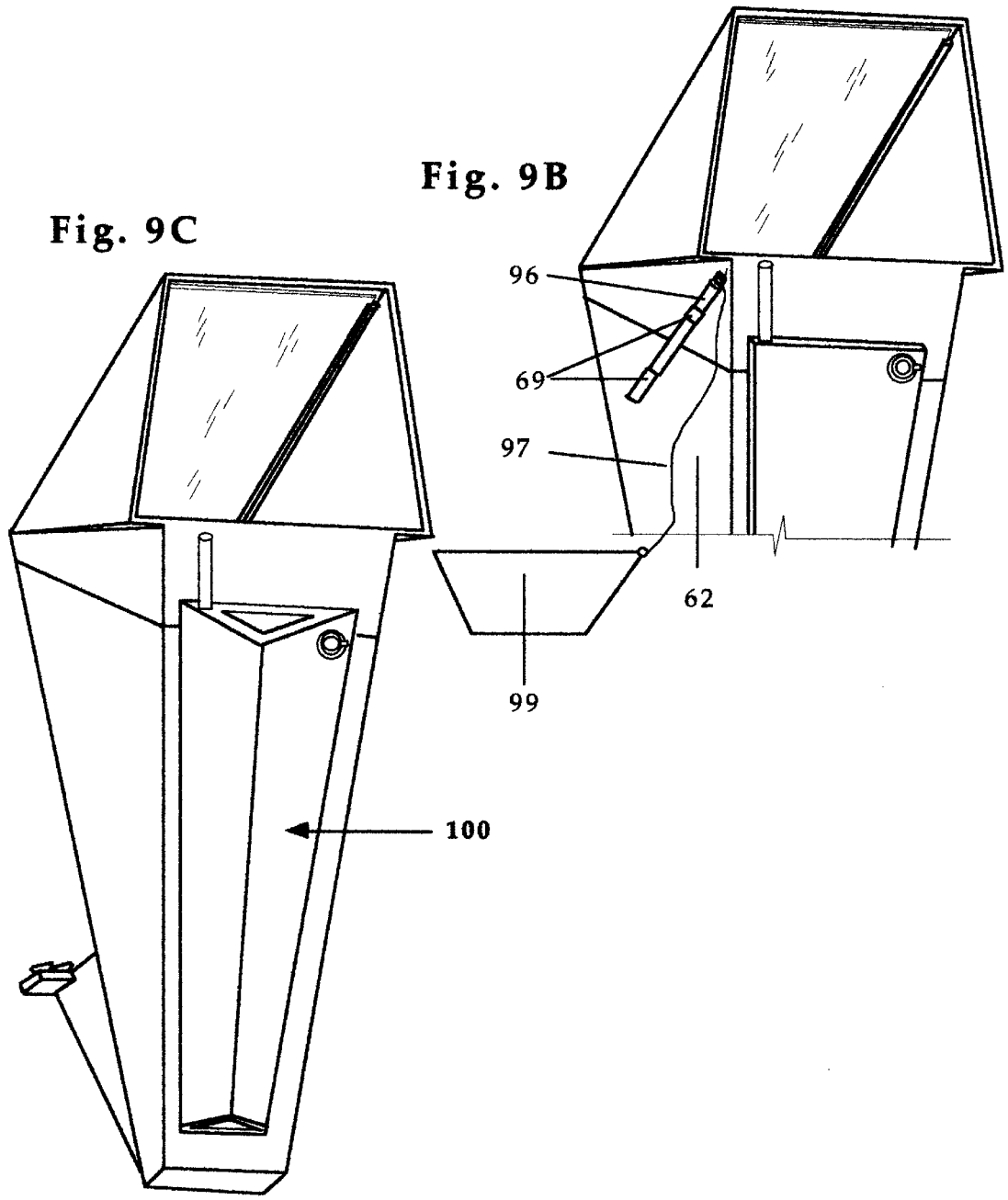

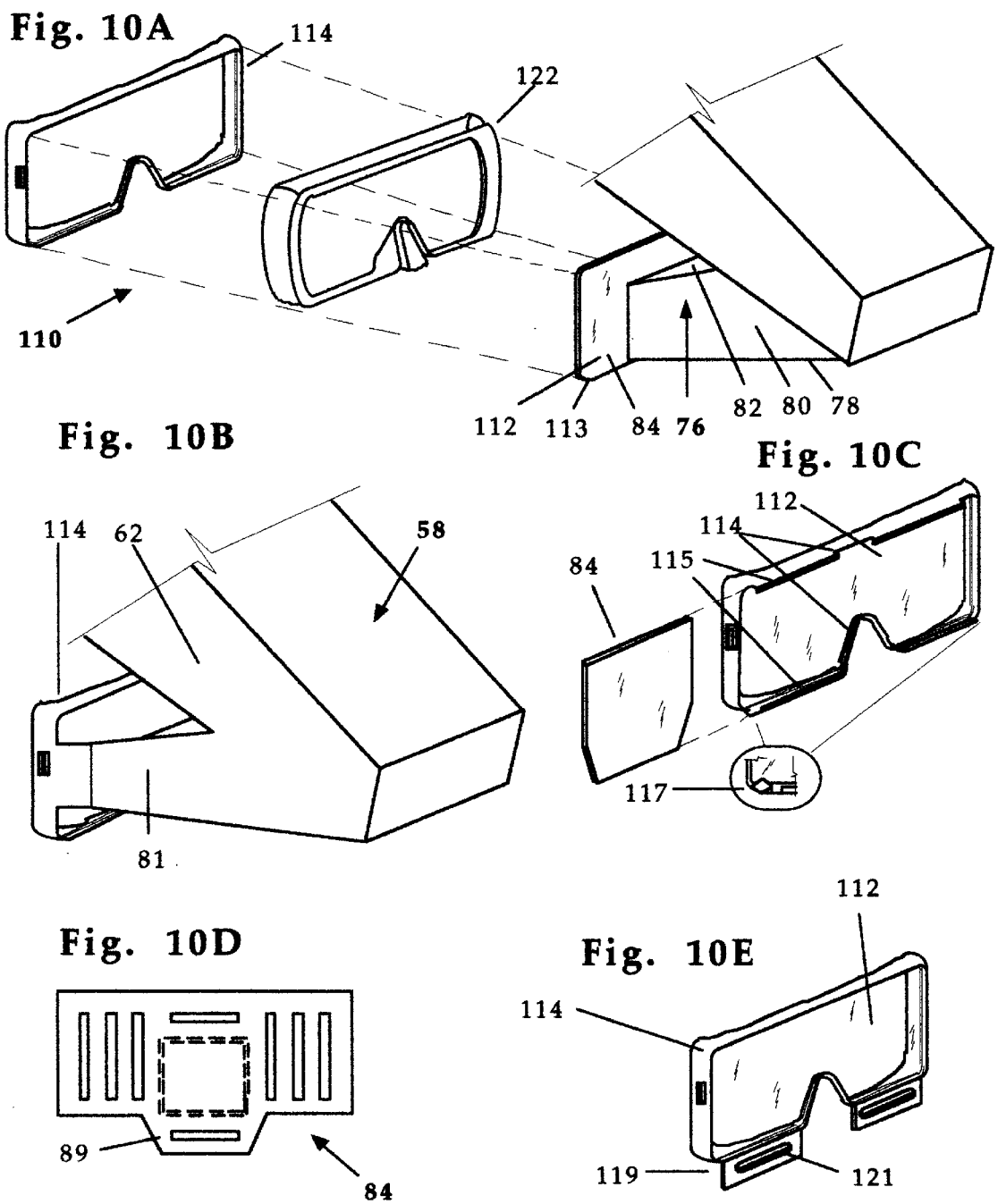

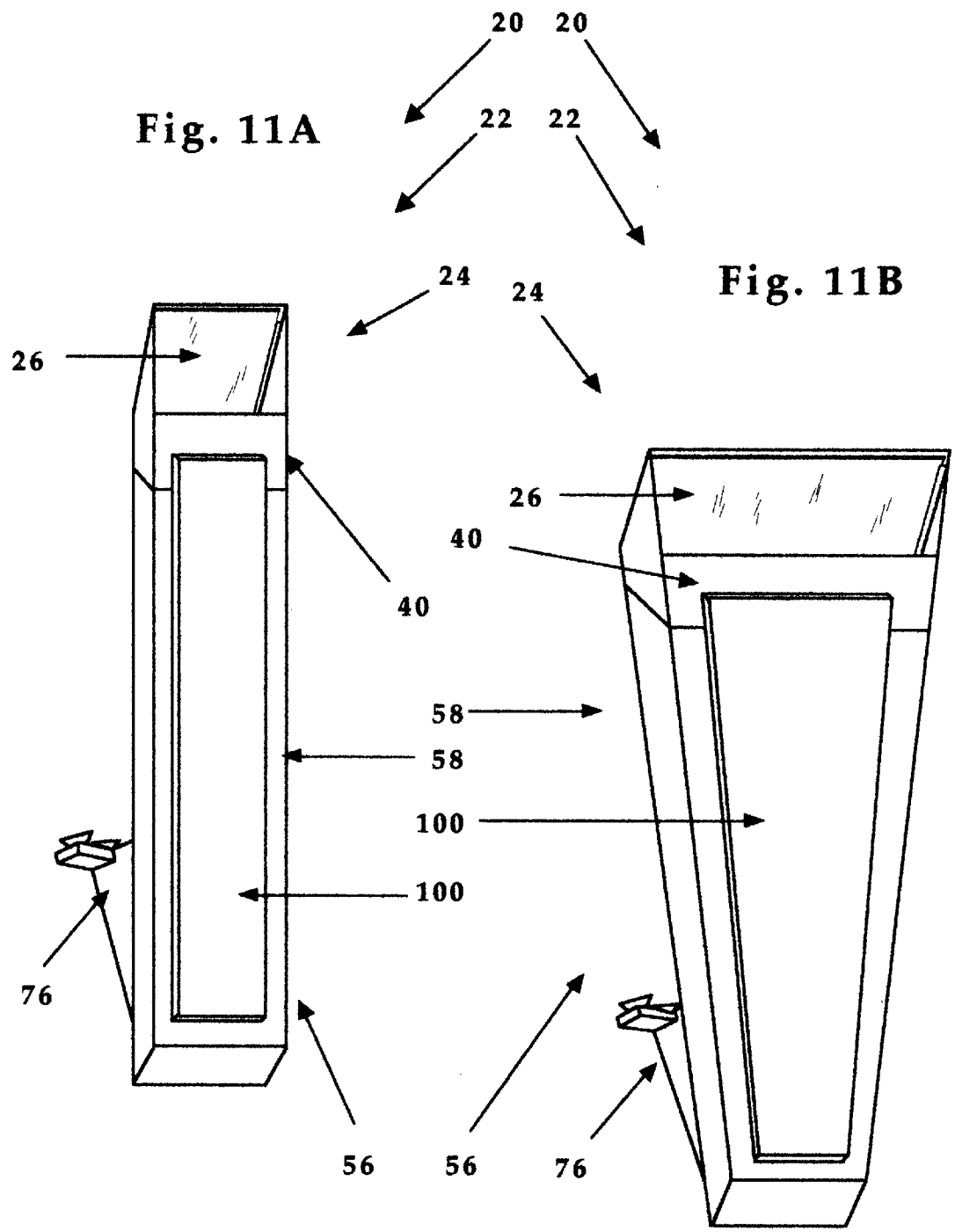

TOY PERISCOPE MASK FOR PLAYING AQUATIC GAMES

BACKGROUND

1. Field of Invention

This invention relates to toys, particularly to a new toy for playing aquatic games. Specifically, this invention relates to a submersible toy periscope, a diving mask, and a coupling mechanism or connecting structure that links such periscope to such mask together.

2. Discussion of Prior Art

Among the aquatic toys of the prior art, one finds submersible toy periscopes. Periscopes are well-known optical instruments that deviate or displace an observer's line of sight to provide a view of a distant object that otherwise would be visually inaccessible. In their most basic form, periscopes consist of a pair of mirrors bonded to an elongated housing, which has inlet and outlet openings. Light rays entering the inlet opening are reflected by the mirrors so that the observer's eyes, located in front of the outlet opening, see such rays. Thereby, the observer is effectively seeing the distant object along the same direction of the initially unreflected light rays.

Most periscopes have parallel rectangular mirrors of equal size. Accordingly, the housing has a uniform and rectangular cross-section. Typically, such rudimentary periscopes have narrow angular fields of view. Specifically, the larger the distance between the user's eyes and the mirror located near the outlet opening, the narrower the sweep of the angular fields of view. Anybody skilled in the domain of geometry and trigonometry, and with a basic knowledge of the principles of ray optics, finds obvious how such a rudimentary periscope should be redesigned to increase the sweep of the horizontal and vertical angular fields of view, without changing the distance between the outlet opening and the user's eye closest to such opening. One wide angle trapezoidal periscope is described in U.S. Pat. No. 4,934,246 to Benson et al (1990); this periscope is specially made for security and military purposes. However, no use of such wide angle trapezoidal housings have been made in submersible toy periscopes.

U.S. Pat. Nos. 5,393,068 to Kane (1995) and 3,533,625 to Kossor et al (1970) make use of periscopes for sighting a toy target located in suitable ground housings. A toy periscope with rectangular cross-section is shown in U.S. Pat. No. 4,887,893 to Dahlgren (1989). Its main advantage is case of manufacturing, since the housing is formed of a one-piece, blow-molded plastic material, and mirror holding elements are easily attached to the inlet and outlet openings.

A submersible toy periscope is shown in U.S. Pat. No. 5,526,177 to Fantone (1996). Fantone's periscope allows a child, whose eyes are located above the surface of a body of water, to see an undisturbed image of objects and processes taking place beneath such surface, even though it may be turbulent. On the other hand, diving masks can also be used by a child when playing aquatic games. Diving masks allow a child, whose eyes are located below such water surface, to see an undisturbed image of underwater objects and processes. Hence, diving masks of the prior art and Fantone's submersible periscope give the user a view of underwater action. In the case of diving masks, the user is also underwater, while in the case of Fantone's periscope the user's head is located above the water surface.

A periscope coupled to the mounting frame of a diving mask is shown in Australian patent No. 224,858 to Girden (1959). Its periscope housing is a rudimentary one consisting of two rectangular parallel minors within an elongated housing of rectangular cross-section. The bottom mirror of the periscope is partially located between the viewing lens of the mask and the eyes of the user.

An underwater breathing-viewing apparatus is shown in U.S. Pat. No. 3,084,687 to Kallmeyer et al (1963). The apparatus is a one-piece structure consisting of an L-shaped periscope integrally formed to the viewing lens of the mask. In such L-shape, the light rays traveling from the top mirror to the bottom one are substantially perpendicular to a line orthogonal to the viewing lens of the mask. Thus, the apparatus is intended for periscope viewing where the underwater user must be in a vertical position.

A diving mask having means for coupling prisms or simply curved lens to the mask, thus improving the user's field of vision, is shown in U.S. Pat. No. 5,420,649 to Lewis (1995). Lewis's mask provides enhanced underwater visibility when the lenses are mounted on the mounting frame of the mask. Lewis's mask is not intended to be coupled to a periscope.

Thus, (1) most aquatic toys of the prior-art do not allow underwater users a simultaneous view of both surface and underwater action when the user is surface swimming in a substantially horizontal position, thereby unduly constraining the range and variety of aquatic games.

Further limitations of toy periscopes and diving masks are that:

(2) It is not possible, in a practical, convenient and reliable manner, for the user to removably couple a toy periscope to a diving mask. Conversely, there are no diving masks in the prior art also comprising structure intended to allow the user coupling the mask to a periscope.

(3) The toy periscope is a rudimentary one, consisting of two rectangular and parallel mirrors within an elongated housing of rectangular cross-section with inlet and outlet openings. Thus, the periscope (a) does not provide an acceptably wide field of vision, particularly if the user's eyes are not located close to the outlet mirror and (b) provides an image with a substantial portion comprising the inner surface of the periscope walls.

Instances in which the above limitations become apparent are when:

A swimming child cannot use almost any of the known toys, toy periscopes, and diving masks to play solitary aquatic games where he or she pretends to be a submarine at periscope depth moving forward while aiming at a floating toy target.

A group of people cannot play battle games while surface swimming. In such aquatic games, each player shoots water at other participants, or at a suitable toy target, either fixed or movable, and the game participants are always following the changing position of other players without having to take their heads out of the water. None of the known aquatic toys, toy periscopes, and diving masks can be used to play such games in a convenient manner.

In the above aquatic games, inaccurate shots are difficult to assess because they are very likely to fall outside the narrow field of view of the above rudimentary periscopes, when aimed at a suitable toy target.

Obviously, several or all the previous reasons may concurrently apply. For example, in, Dahlgren's and Girden's periscopes, a substantial portion of the image comprises the periscope walls. Moveover, the images of Girden's and Dahlgren's periscopes are restricted to a narrow field of view. Also, when submerged in water, Dahlgren's periscope does not provide a flat air-water interface within the periscope housing. Moreover, it cannot be coupled to a diving mask in a convenient or reliable manner. On the other hand, Fantone's dual-view submersible periscope is intended to be used by a child, whose eyes are located above the water surface, to see objects located underwater, and suffers from the same limitations of all rudimentary periscopes whose cross-section is rectangular and uniform. Also, its design does not allow it to be coupled to a diving mask in a simple manner. Kallmeyer's breathing-viewing apparatus does not allow surface swimming and surface viewing simultaiteously. Moreover, Kallmeyer's apparatus is primarily intended for periscope viewing. Furthermore, Kallmeyer's apparatus keeps the face of the user at atmospheric pressure, thus preventing the user from reducing the air pressure between the viewing lens and the user's face. Lewis' diving mask is intended to enhance underwater viewing by coupling the mask to suitable curved lenses. Furthermore, if Dahlgren's, Kallmeyer's, or Girden's periscopes were connected to Lewis' mask, they would all limit the user to a vertical position for periscope viewing, thus precluding simultaneous surface viewing and surface swimming.

In the realm of aquatic battle games, U.S. Pat. No. 4,077,629 to Chestney (1978) shows a battle game where each player is equipped with a water gun attached to a ship by a tether line. The purpose of the game is to sink the opponent's ship, which includes means for directing water shots into a hull that fills with water until sunk. However, all of the game's relevant action takes place above the water surface of the swimming pool; furthermore, the players' heads are also constrained to be above such surface. U.S. Pat. No. 5,514,023 to Warner (1996) shows a toy torpedo that game participants throw at each other, the participants and the toy torpedo being always underwater during the game. On the other hand, U.S. Pat. No. 5,435,569 to Zilliox (1995) gives an extensive list of references involving stationary toy targets for water games. According to Zilliox, some of these references involve toy targets that provide a quantitative indication of who is winning the game, but none of such targets are suitable for a mobile simulated combat game on the ground. Thus, it follows that they are not suitable for a mobile simulated aquatic battle game either.

Hence, further extending the previous list of limitations to a more general list of limitations of toys for playing aquatic games, we have:

(4) The few toys used to play aquatic battle games cannot be used by underwater players for aquatic battle games which action takes place above the water surface.

Zilliox's toy provides a mobile target with a cumulative measure of how many times, and how accurately, it has been hit during the course of a simulated battle. Moreover, it provides a mechanism that disables a player's water pistol from firing when the player has exceeded his or her "lifeline" so that he must drop out of combat. However, Zilliox's toy cannot be used to play aquatic games, where participants are either swimming or floating. This is because it is inconvenient to do that when one hand constantly holds a toy. On the other hand, U.S. Pat. No. 4,890,767 to Burlison (1990) describes a headband mounted water squirting device connected to a hand held water reservoir containing a trigger-actuated pump. When swimming, it is desirable to have both hands free. Thus, the hand-held water reservoir is inconvenient in such context. Hence, additional limitations of prior-art toys to play aquatic games are that:

(5) There are no aquatic toys, which further comprise a water streaming mechanism, that (a) can be conveniently used by a player without limiting the player's swimming ability, and where (b) the streaming mechanism is disabled from firing once a given threshold in the amount of water shots made by such player is exceeded.

(6) The periscope masks of the prior art do not comprise any scoring mechanism for playing aquatic battle games. For example, Girden's periscope mask, besides not allowing a wide field of view above the surface, does not comprise any structure functioning as a scoring mechanism for playing aquatic battle games, Kalleyer's periscope mask, besides not allowing simultaneous surface swimming and surface viewing, does not have a scoring mechanism either.

(7) The periscope masks of the prior art cannot be used by a child over a time scale larger than ten to twenty months, approximately, for the child's face is changing dimensions and shape as the child grows up. Thus, a new periscope mask must be bought every few years. This is the case of Girden's and Kallmeyer's periscope masks where the mask and the periscope are not intended to be disconnected or separated from each other. Moreover, when the mask and periscope are not detachable, the periscope can only be used together with the mask; thus, the periscope cannot be used as any other toy periscope, if so desired.

OBJECTS AND ADVANTAGES

Accordingly, several objects and advantages of our invention are:

(1) To provide a new aquatic toy that gives underwater users a simultaneous view of both surface and underwater action when such users lie in a substantially horizontal position while surface swimming, thereby enhancing the variety and scope of aquatic games.

(2) To provide a new and improved toy periscope that can be removably coupled to a diving mask in a practical, convenient, and reliable manner, thereby creating a new aquatic toy comprising such periscope and mask, when so coupled. Conversely, to provide a new and improved diving mask intended to be coupled to a suitable toy periscope, thereby creating a new aquatic toy comprising such mask and periscope, when so coupled. Specifically, to provide a toy mask periscope that provides a substantially unobstructed view of the underwater surroundings; that is reasonably stable against the torque to which it will be subjected to when used underwater by an unpredictably moving child engaged in suitable battle games; that can be easily worn and used by a child; that does not produce neck discomfort when used for reasonably large periods of time by a person that is floating or swimming in a substantially horizontal position, but who is also facing forward and looking above the surface through the mask periscope; and, that gives the user the flexibility to position the periscope in front of his or her eye with best eye sight, leaving the other eye substantially unobstructed by the periscope.

(3) To provide a toy mask periscope whose periscope has an improved housing geometry. Specifically, to provide a periscope that gives an acceptably wide field of vision around close objects when the user's eyes are not located close to the outlet mirror, where the image seen by the user comprises a substantially negligible portion of the inner surface of the periscope walls, where the image of objects located above the water surface is distortion-free, when the periscope is partially immersed in water, and where, if the periscope user is floating and facing substantially down, objects located just above the surface are potentially within the field of view of the periscope, which outlet or viewing window is positioned in front of a diving mask being worn by the user.

(4) To provide a new aquatic toy for playing battle games so that the game's action takes place above the water surface while the players are substantially underwater.

(5) To provide a new aquatic toy, which comprises a suitable streaming mechanism that does not limit the user's swimming ability; such streaming mechanism is unabled to fire once a given threshold of the amount of water shots made by the user is exceeded.

(6) To provide a new aquatic toy, which comprises a scoring mechanism for playing aquatic battle games, and which comprises a submersible periscope that gives the user a wide field of view above the surface while simultaneously allowing surface swimming.

(7) To provide a new aquatic toy, which comprises a submersible periscope that can be flexibly adapted to many different types of diving masks so that: (a) when the user grows up the user only needs to buy a new diving mask, not a new toy periscope mask, and (b) the periscope can be used as any other toy periscope, if so desired (as opposed to being always used together with the diving mask).

Other objects of our invention are
to provide a new aquatic toy that gives instantaneous feedback to its user when hit by toy projectiles and water shots from opponents in suitable aquatic battle games;
to provide a new aquatic toy, which comprises a suitable scoring mechanism, that fully impairs surface visibility once a given threshold is exceeded in either the amount of water shots, or in the number of toy projectiles, that have successfully hit such mechanism;
to provide a new aquatic toy to allow children, as well as adults, to play the roles of destroyers, and the corresponding convoy's ships, on one hand, and a wolf pack of U-boats, on the other hand;
to provide a versatile aquatic toy that can be easily adapted to the role of U-boat or to the role of destroyer; and,
to provide a reasonably priced aquatic toy.

Further objects and advantages are to provide an aquatic toy that can be used as a learning tool to enhance imagination, quick decision making, spatial visualization, and motor skills, in a playful outdoor water environment where participants are also engaged in physical exercise. Still further objects and advantages will become apparent from a consideration of the ensuing description and drawings.

DRAWING FIGURES

FIGS. 5R and 5L are top rear views of the aquatic toy of the present invention where the above periscope is coupled to the right and left user's eye side, respectively, of a diving mask's glass.

Figure 6A:
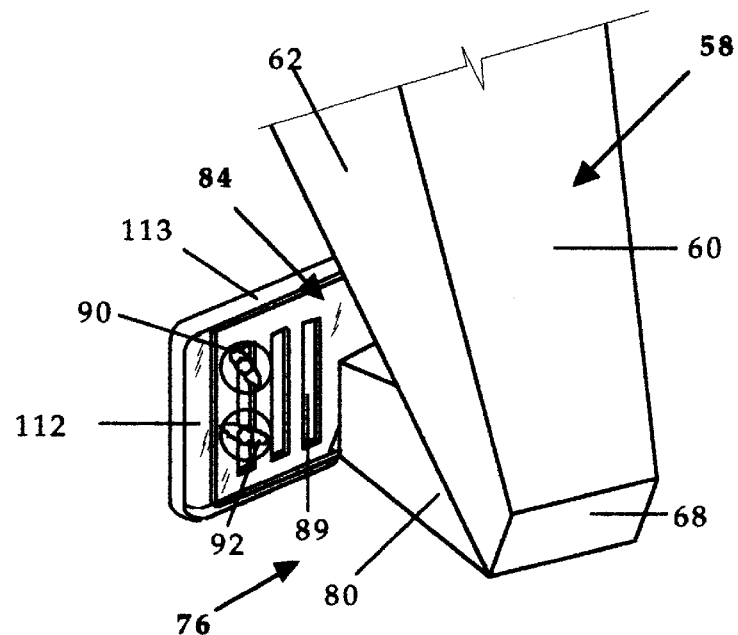
Figure 6B:
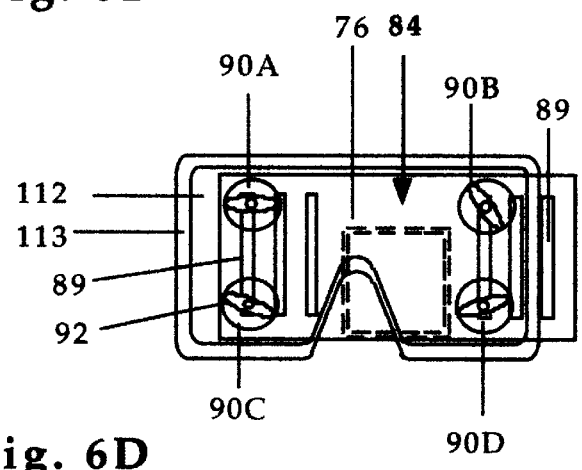
Figure 6C:
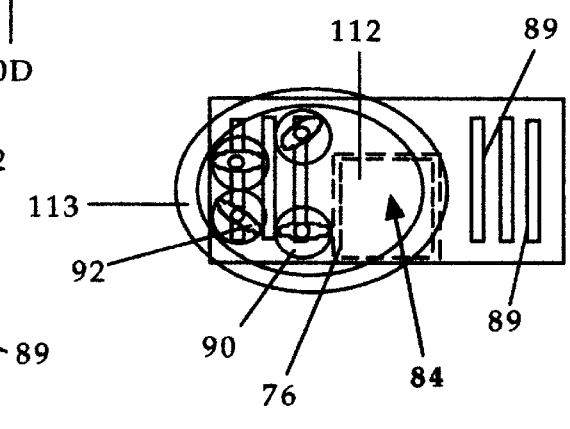
Figure 6D:
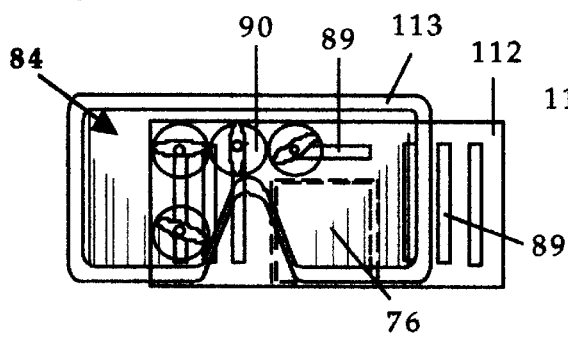

FIG. 6A is a perspective view of a pyramidal ancillary housing, whose suction cups can be positioned to mate with substantially any flat mask's glass. FIG. 6B is a front view of the support top of the ancillary housing of FIG. 6A, when its suction cups are coupled to the flat glass of an adult size diving mask. FIG. 6C is another front view of the support top of FIG. 6A, when coupled to an elliptical glass of a small mask. FIG. 6D is a front view of a preferred support top, when coupled to a curved sight glass.

Figure 7A:
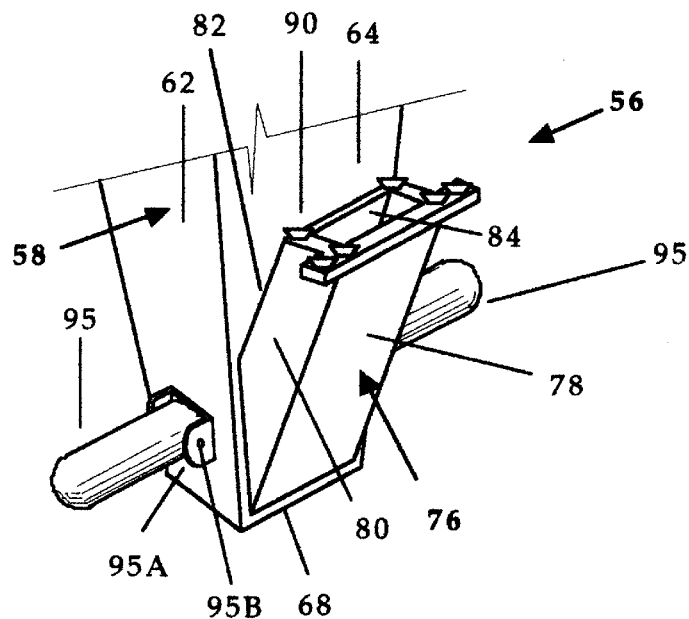
Figure 7B:
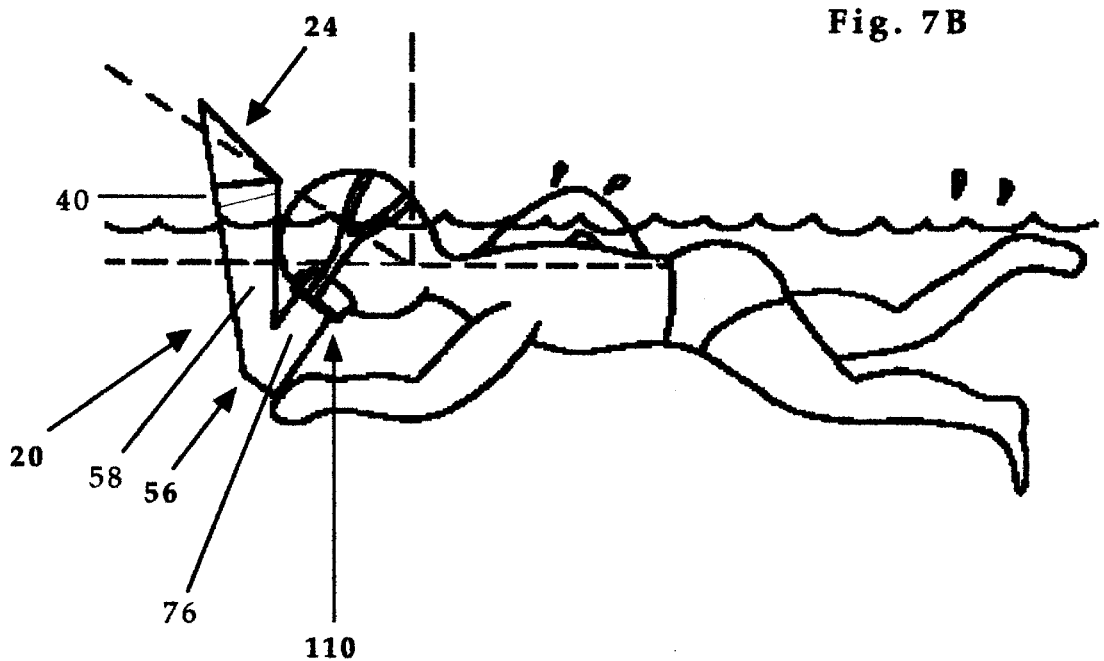

FIG. 7A shows a perspective side view of a lower underwater housing of the periscope of the aquatic toy of the present invention, further comprising a pair of handles. FIG. 7B is a perspective side view of the toy periscope mask of the present invention, when being used by a human that is surface swimming.

Figure 8A:
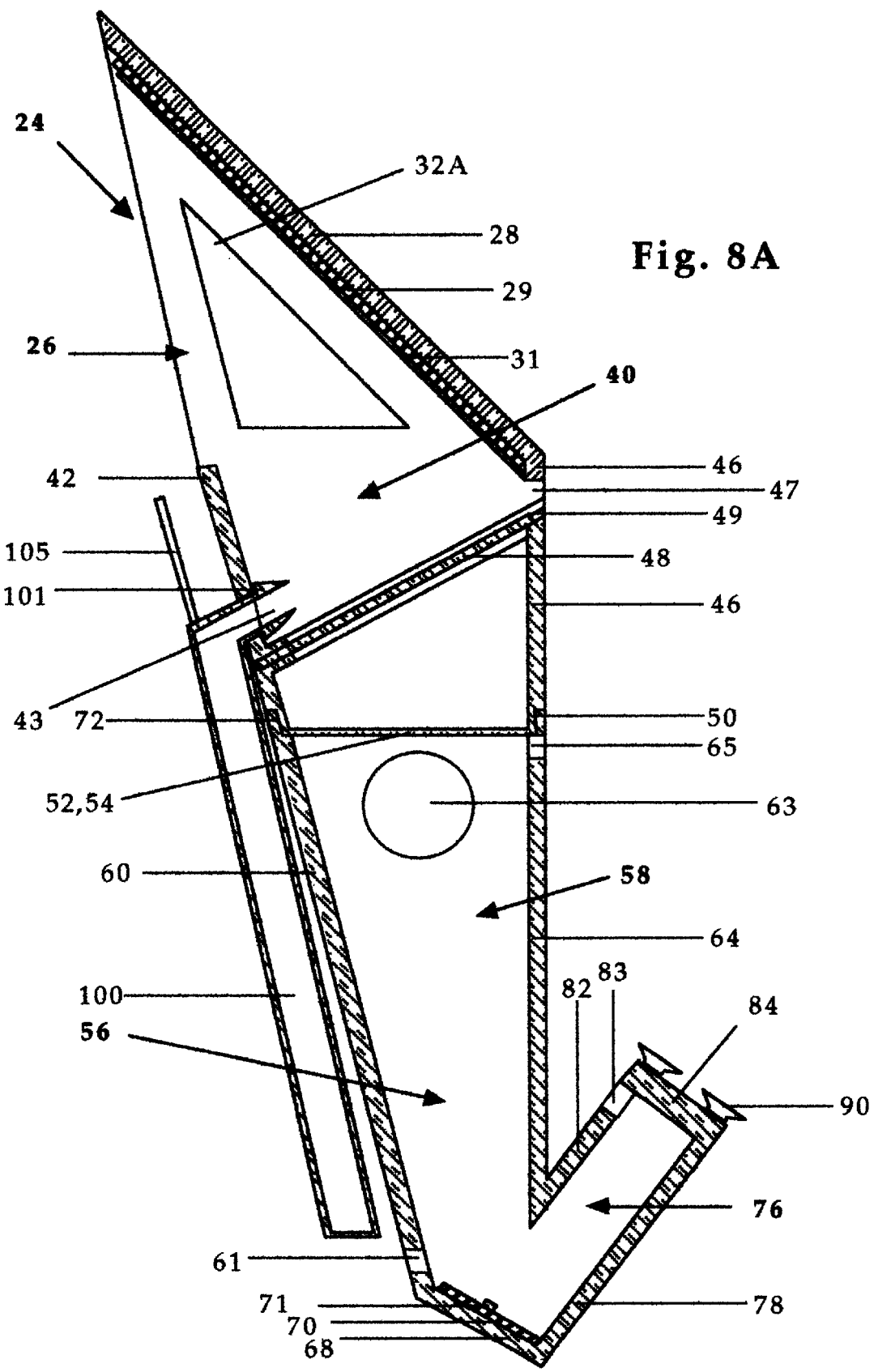

FIG. 8A shows a side cross-sectional view of a fully submersible periscope embodiment taken along line 8A—8A of FIG. 8B. FIG. 8B shows a perspective view of the fully submersible embodiment of FIG. 8A further comprising an ancillary target or basket. FIG. 8C shows such embodiment when an external pipe is substituted for the basket of FIG. 8B.

FIGS. 9A, 9B, and 9C show the periscope of the aquatic toy of the present invention further comprising several accessories. FIG. 9A shows an underwater housing with a removable blocking screen accessory. FIG. 9B shows a floating target and a mast. FIG. 9C shows a prow shaped water collector.

FIG. 10A shows an exploded perspective view of a toy periscope mask embodiment where the support top of the ancillary housing is integrally formed to the sight glass of the mask. FIG. 10B shows a perspective view of a toy periscope mask embodiment where the mounting frame of the diving mask is integrally formed to the periscope housing. FIG. 10C shows an exploded isometric view of a diving mask with guiding grooves that mate with a suitable support top of a periscope housing. FIG. 10D shows a preferred support top. FIG. 10E shows a preferred diving mask with guiding grooves that mate with the slits of the preferred support top of FIG. 10D.

FIG. 11A and 11B show perspective views of rudimentary alternative embodiments of the periscope of the aquatic toy of the present invention whose periscope housings have a rectangular and substantially uniform cross-section, and a non-uniform rectangular cross-section with parallel front and rear walls, respectively.

Reference Numerals in Drawings

| | |
|---|---|
| 20 | Periscope |
| 22 | Periscope housing |
| 24 | Upper or surface level housing |
| 26 | Upper trapezoidal housing |
| 28 | Top wall or top end |
| 29 | Top mirror |
| 31 | Guiding groove |
| 32 | Sloping side walls |
| 32A | Holes |
| 34 | Side wings |
| 38 | Inlet opening |
| 40 | Upper pyramidal housing |
| 42 | Upper front wall |
| 43 | Front aperture |
| 44 | Upper side walls |
| 46 | Upper rear wall |
| 47 | Rear aperture |
| 48 | Slanted transparent window |
| 49 | Guiding groove |
| 50 | L-shaped downside border |
| 52 | Transparent bottom wall |

-continued

| Reference Numerals in Drawings | |
|---|---|
| 54 | Boundary between upper and lower housings |
| 56 | Lower or underwater housing |
| 58 | Lower pyramidal housing |
| 60 | Lower front wall |
| 61 | Water flooding hole |
| 62 | Lower side walls |
| 63 | Circular orifice |
| 64 | Lower rear wall |
| 65 | Air draining hole |
| 68 | Bottom end |
| 69 | Mast support |
| 70 | Flexible bottom mirror |
| 71 | Locking arrows |
| 72 | L-shaped upside border |
| 74 | Passageway between pyramidal and ancillary lower housings |
| 76 | Lower ancillary housing |
| 78 | Front wall |
| 80 | Side walls |
| 81 | Side strips |
| 82 | Rear wall |
| 83 | Air draining hole |
| 84 | Support top |
| 89 | Slits |
| 90A–F | Suction cups |
| 92 | Wing nuts |
| 94A | Removable blocking screen |
| 94B | Viewing area |
| 95 | Handles |
| 95A | Brackets |
| 95B | Pivot pins |
| 96 | Mast |
| 97 | String |
| 98 | Floating toy target |
| 100 | Water receptacle |
| 101 | Locking arrows |
| 103 | Lockable aperture |
| 105 | Vent pipe |
| 108A | Ancillary target or basket |
| 108B | External pipe or conduit |
| 110 | Diving Mask |
| 112 | Viewing lens or sight-glass |
| 113 | Lens rim |
| 114 | Mounting or mask frame |
| 115 | Guiding grooves |
| 117 | Flexible locking slips |
| 119 | Flange |
| 121 | Guiding grooves or slits |
| 122 | Face fitting member or rubber body |

SUMMARY

In accordance with the present invention, we provide a new aquatic toy comprising an improved toy periscope suitably coupled to a diving mask. Such periscope preferably has an upper housing connected to an inverted pyramidal housing, which is integrally formed to an ancillary housing or structure that provides support for the coupling mechanism. The ancillary structure and the pyramidal housing generally form a V-shaped configuration so that the whole periscope mask unit can be worn, for reasonably large periods of time, and without producing neck discomfort, by a downwardly and forwardly facing user swimming along the surface of a suitable body of water.

Such aquatic toy allows underwater users to see objects and events above the water surface, thereby allowing them to play aquatic games whose action takes place above the water surface. Moreover, the periscope mask coupling, which preferably makes use of suction cups, does not fully obstruct the underwater view through the glass of the mask. Preferably, the positions of the suction cups are adjustable. Hence, the periscope can be coupled to most commercially available models of diving masks. Also, the user can attach the periscope to the mask so that the viewing window area is suitably centered in front of his or her eye with best sight. Last, suction cups provide a removable, inexpensive, and easy way to do such coupling.

An inlet opening allows light to enter the periscope housing, but it also works as a target for opposite players. A transmission window in the upper housing allows the periscope's user to observe water shots or toy projectiles that enter the upper housing. Also, such transmission window is preferably beveled so that such water falls toward the front wall, where an aperture directs it into a receptacle located externally to the periscope, but positioned substantially in front of the lower housing. Thus, when the receptacle becomes full, water begins to cover the slanted window, thereby progressively distorting the corresponding image, until it is substantially covered by water.

The pyramidal and ancillary housings of fully submersible variants of the above partially submersible preferred embodiment further comprise suitably located surface voids or holes. Thus, such housings become flooded, thereby substantially suppressing the flotation force present in partially submersible embodiments, which never flood. Such fully submersible embodiments also comprise an additional transparent bottom wall located below the slanted window. When the lower part of the pyramidal housing becomes fully flooded, while the upper housing stands above the water surface, this transparent bottom works as a flat air-water interface that does not disturb the corresponding optical image.

General Structure of a Partially Submersible Embodiment

Figure 1:
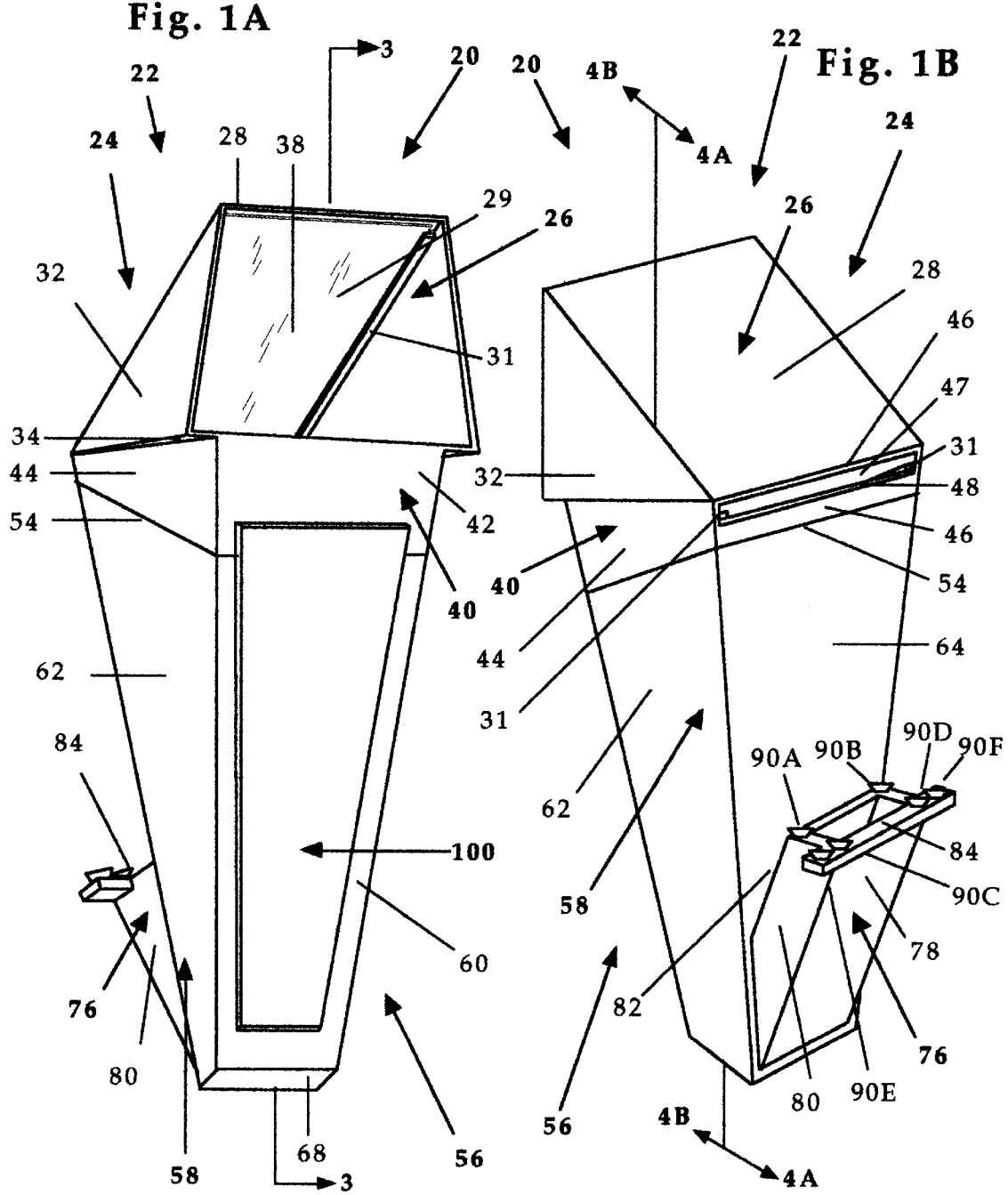
FIGS. 1A and 1B are front and rear perspective views, respectively, of a partially submersible preferred embodiment of the periscope of the aquatic toy of the present invention.
Figure 2:
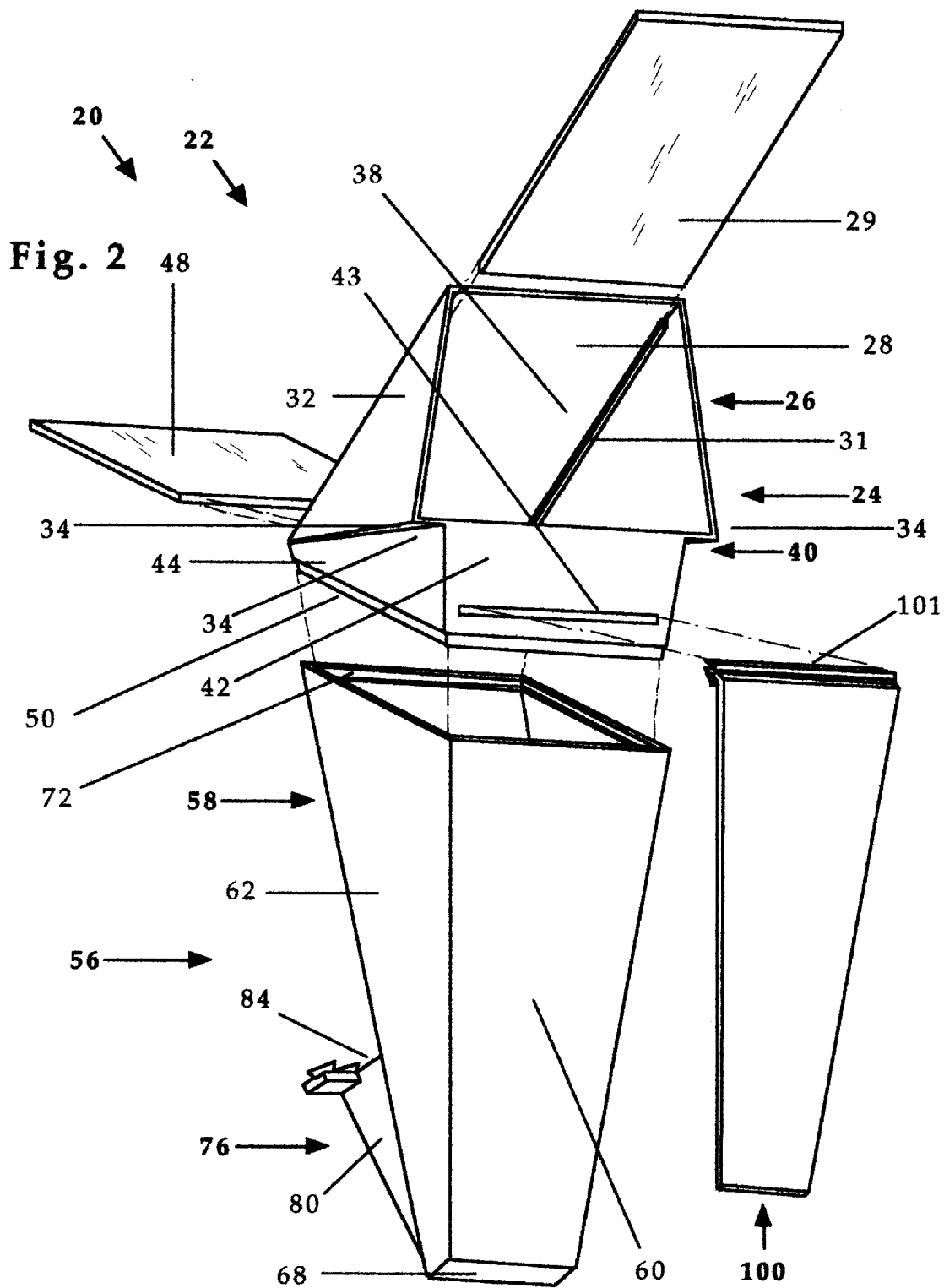
FIG. 2 is an exploded isometric view of the embodiment shown in FIGS. 1A and 1B.

FIGS. 1A, 1B, and 2

Figure 3:
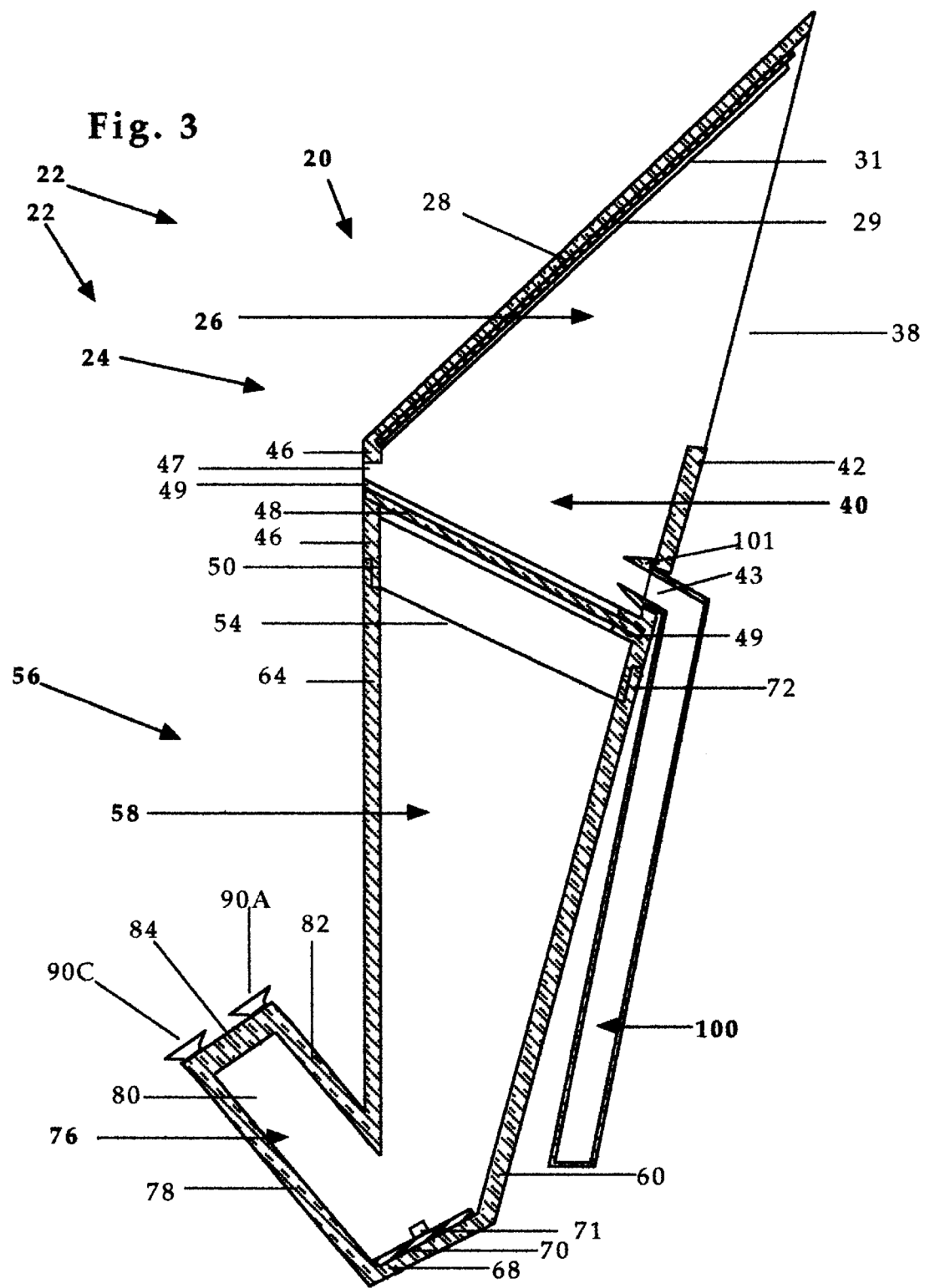
FIG. 3 is a cross-sectional view of the above embodiment when cut along the plane indicated by line 3—3 of FIG. 1A.

FIGS. 1A, 1B, and 2 show the general structure of a partially submersible preferred embodiment of a periscope 20 of the toy mask periscope of the present invention. Specifically, FIGS. 1A and 1B show front and rear isometric views, respectively, while FIG. 2 is an exploded isometric view. Periscope 20 comprises a periscope housing 22, a water receptacle 100, and the following optical elements: a top mirror 29, a slanted transparent window 48, and a flexible bottom mirror 70 (which is shown in FIGS. 3 and 4). Periscope housing 22 comprises an upper, inlet, target, or surface level housing 24, and a generally V-shaped, lower, underwater housing 56. Removable upper housing 24 is firmly inserted into lower housing 56, while removable water receptacle 100 is connected to upper housing 24, but it is located substantially in front of that part of underwater housing 56 that is generally collinear with upper housing 24. Optical elements 29, 48, and 70 are inserted into periscope housing 22 during assembly. The housings and the optical elements are preferably made of polycarbonate, while receptacle 100 is made of a flexible plastic, not necessarily transparent.

On one hand, surface housing 24 comprises an upper trapezoidal housing 26 integrally formed to an upper, inverted, truncated, pyramidal housing 40, which lies below housing 26. On the other hand, V-shaped underwater housing 56 comprises a lower pyramidal housing 58, integrally formed to a lower, ancillary, outlet, or viewing housing 76. The length of lower housing 58 is about three to four times the length of ancillary housing 76. Thus, the arms of such V-shape are of unequal length.

Lower pyramidal housing 58 has an inverted, truncated, generally pyramidal shape of rectangular cross section, if such cross section is taken parallel to the bottom of housing 58, otherwise it is trapezoidal. Accordingly, upper pyramidal housing 40 is a natural continuation or extrapolation of housing 58. In the partially submersible embodiment shown, ancillary underwater housing 76 is a truncated parallelepiped with constant rectangular cross-section (before truncation) that ends with a generally T-shaped support top 84. At the locus of such truncation, ancillary housing 76 joins lower pyramidal housing 58, forming the general V-shape of underwater housing 56.

Upper trapezoidal housing 26 comprises a rectangular top wall 28, a pair of triangular sloping side walls 32, and a pair of triangular side wings 34. The peripheral edges of top wall 28, side walls 32, side wings 34, and the top edge of an upper front wall 42 of upper housing 40, define an inlet opening 38 of trapezoidal shape located above, and in the same plane of, upper front wall 42. The inwardly facing rectangular surface of top wall 28 is covered by top mirror 29, connected to the top wall by a pair of guiding grooves 31.

Upper pyramidal housing 40 comprises the already mentioned upper front wall 42, a pair of upper side walls 44, and an upper rear wall 46. Upper front wall 42 has a rectangular front aperture 43, to which removable water receptacle 100 is fastened by insertion of a pair of flexible locking arrows 101 integrally formed to the receptacle. Slanted transparent window 48, which is located in the inner void space defined by the walls of upper pyramidal housing 40, has a substantially rectangular, but trapezoidal shape. Finally, upper rear wall 46 is the natural continuation of a lower rear wall 64 of pyramidal underwater housing 58. A rectangular rear aperture 47 is located at upper rear wall 46. It is through rear aperture 47 where transparent window 48 is manually inserted into upper housing 24 during assembly. Alternatively, window 48 can be integrally formed to housing 40. In any case, one edge of window 48 covers the bottom edge of rear aperture 47, while the corresponding opposite window's edge is located just below front aperture 43.

Lower pyramidal housing 58 comprises a rectangular bottom end 68 and four substantially vertical walls: a lower trapezoidal front wall 60, two lower side walls 62, and a lower rear wall 64. The top or peripheral edges of these walls define a slanted trapezoidal boundary, congruent with the slanted trapezoidal bottom periphery of upper pyramidal housing 40 of upper housing 24. Specifically, the downwardly facing bottom edges of the walls of upper pyramidal housing 40 have an L-shape that is both horizontally and vertically inverted. Such inverted L-shape defines a downside pointing border 50, which mates with the corresponding peripheral, L-shaped, pointing to the upside, border 72 of the corresponding walls of lower pyramidal housing 58. More specifically, L-shaped downside border 50 of surface housing 24 runs along the edges of walls 42, 44, and 46 of upper pyramidal housing 40. On the other hand, L-shaped upside border 72 of underwater housing 56 runs along the top edges of walls 60, 62, and 64 of lower pyramidal housing 58. Finally, borders 50 and 72, when coupled together, define a thin but externally visible boundary 54 between the upper and the underwater housings. Thus, removable upper housing 24 is firmly coupled to underwater housing 56 by the friction or contact forces between borders 50 and 72. In the case of partially submersible embodiments, housing 22 can also be integrally formed in one piece, provided that slanted window 48 is manually inserted. In the embodiment shown, lower ancillary housing 76 comprises a rectangular front wall 78, two trapezoidal side walls 80, a rectangular rear wall 82, and the already mentioned T-shaped support top 84.

Periscope 20 further comprises six suction cups 90A–90F, suitably connected to support top 84. Finally, line 3—3 in FIG. 1A indicates the position of a plane of symmetry of periscope 20 along which we take the cross-sectional view shown in FIG. 3. Suction cups 90 are arranged in two L-configurations, of three cups each, symmetrical with respect to such plane.

Figures 4A, 4B:
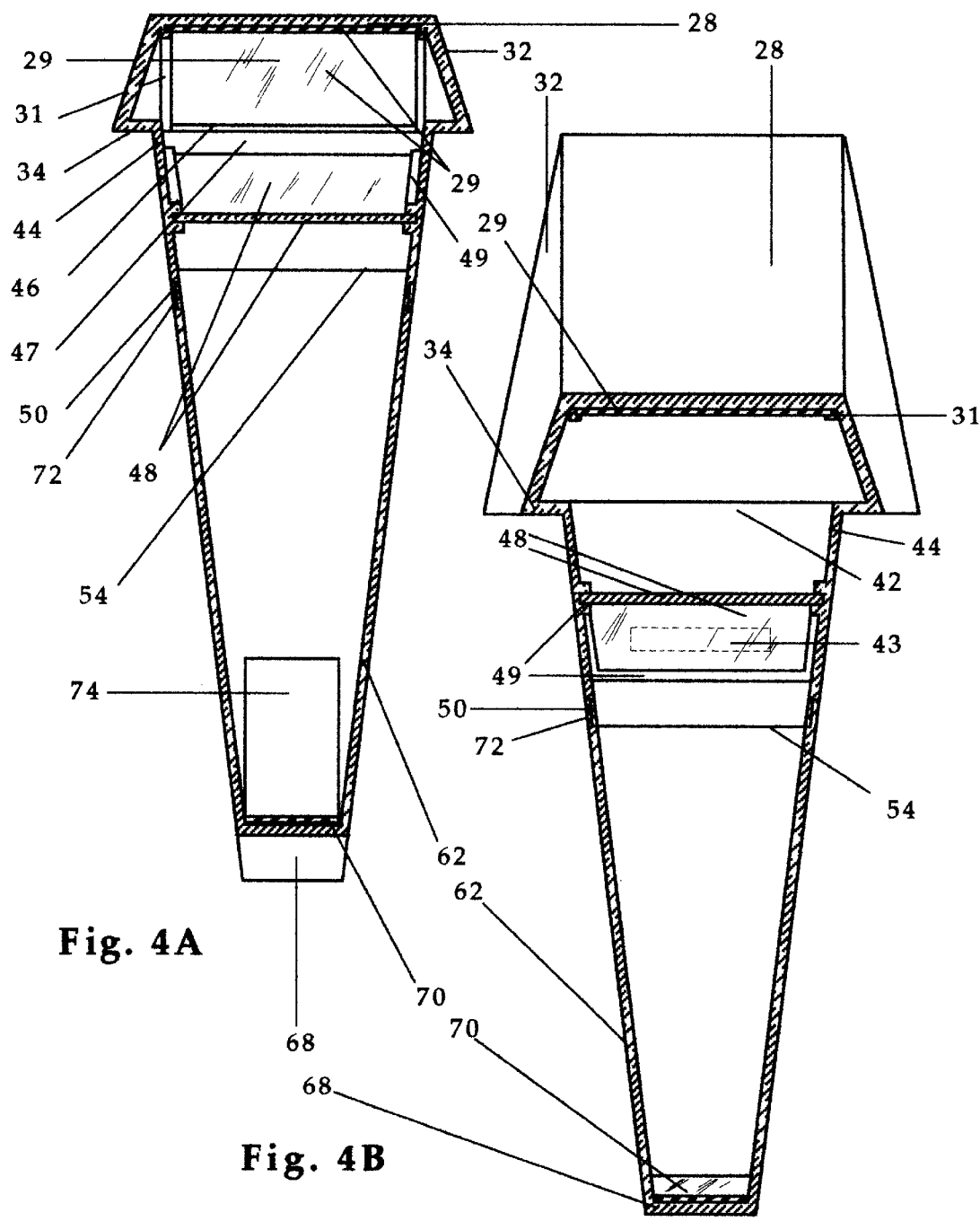
FIGS. 4A and 4B are cross-sectional views thereof when cut along the plane indicated by lines 4A—4A and 4B—4B of FIGS. 1A and 1B, respectively.

Detailed Structure of above Embodiment
FIGS. 3, 4A, and 4B

FIG. 3 is a cross-sectional view of the above preferred embodiment when cut along the plane indicated by line 3—3 of FIG. 1A. FIGS. 4A and 4B are opposite cross-sectional views of such preferred embodiment, when cut along the plane indicated by lines 4A—4A and 4B—4B of FIG. 1B. Top wall 28 of the upper housing has an inclination of 45° (135°) with respect to the plane defined by rear walls 46 and 64. Top mirror 29 is parallel to, and in full surface contact with, the surface of top wall 28 that faces inlet opening 38. Top mirror 29 is kept in a fixed position with respect to top wall 28 by the static friction or contact forces between top wall 28 and mirror 29, and between mirror 29 and guiding grooves 31. These grooves are integrally formed with top wall 28, and run along the two edges of the top wall that are not parallel to the rear walls. The gap width of each groove 31 is larger but substantially equal to the thickness of mirror 29 so that such mirror can be manually inserted into upper housing 24 during assembly. Thus, removable mirror 29 is firmly connected to top 28.

Each side wing 34 projects outwardly from the corresponding upper side wall 44. The plane defined by wings 34 is perpendicular to rear walls 46 and 64, and to the plane of symmetry of periscope 20. Each sloping side wall 32 connects the longest edge of the corresponding side wing 34 to the corresponding forwardly and upwardly pointing edge of top wall 28. The common edge of each sloping side wall 32 and the corresponding side wing 34, on one hand, and the top edge of the corresponding upper side wall 44, which in FIGS. 4A and 4B is oriented normal to the paper, on the other hand, define an angle equal to one half of a predetermined value of the horizontal angular field of view.

Upper front wall 42 lies in the same plane defined by lower front wall 60. The angle between the plane of front walls 42 and 60, and the plane of rear walls 46 and 64, equals a predetermined value of the vertical angular field of view. In the embodiment shown, water receptacle 100 is a substantially flat trapezoidal parallelepiped whose top end bends almost orthogonally thereto into a pair of fastening ends or locking arrows 101 that are flexibly inserted into front aperture 43 during assembly. Once inserted locking arrows 101 leave the size of aperture 43 substantially identical to its size before insertion, if receptacle 100 is made of a thin material.

Slanted window 48 lies about 25° forwardly and downwardly below a horizontal line, if rear walls 46 and 64 are vertically oriented. Guiding groove 49 runs along the inwardly facing surfaces of upper front wall 42 and upper side walls 44, and is integrally formed to such walls, so that slanted window 48 together with groove 49 provide structure to substantially impede water flow from surface housing 24 to underwater housing 56. Obviously, the gap width of groove 49 is larger but substantially equal to the thickness of slanted window 48. The slanted window can also comprise a suitable rubber ring (not shown) that embraces its edges. The bottom edge of rear aperture 47 faces forward and upward, coplanar to the downwardly facing surface of slanted window 48. Guiding groove 49 is located and oriented so that, when slanted window 48 is inserted into the groove, such edge is in complete mechanical contact with window 48. Before slanted window 48 is inserted into groove 49, bottom mirror 70 is inserted between bottom end 68 and a pair of locking arrows 71. Mirrors 29 and 70 must be distortion free. Locking arrows 71 are located in the middle of the two shortest sides of mirror 70, in order to facilitate its reversible or elastic bending.

The inclination of each lower side wall 62, with respect to a vertical plane orthogonal to vertically oriented rear walls 46 and 64, equals one half of the predetermined value of the horizontal angular field of view. The length of the top edge of trapezoidal upper rear wall 4 6 equals the length of the corresponding edge of trapezoidal upper front wall 42. This length is a known function of the combined length of rear walls 46 and 64, the width of mirror 70, and the value of the horizontal angular field of view. The length of the uppermost edge of top wall 28 also equals the length of the top edge of walls 42 and 46. However, the top end and the top mirror can also be trapezoidal. Finally, such uppermost edge lies in the same plane defined by walls 42 and 46.

Walls 78, 80, and 82 of ancillary underwater housing 76, at the locus where they meet lower pyramidal housing 58, define a door or passageway 74 of rectangular shape, coplanar to lower rear wall 64. The dimensions and orientation of ancillary housing 76, with respect to lower pyramidal housing 58, are directly related to the operation of periscope 20, to be discussed later. The thickness of T-shaped support top 84 is large enough to allow the screws (not shown) of all six suction cups to enter top 84 without breaking through. Thus, such thickness will be typically larger than the thickness of all other parts of periscope 20, which we prefer to be about 2 or 3 mm. The positions of the suction cups are related to how the periscope is coupled to a diving mask.

Inverted T-Array of Fixed Suction Cups
FIGS. 5R and 5L

FIG. 5R shows a rear top view of the toy of the present invention where periscope 20 is coupled to a viewing lens or sight glass 112 of a diving mask (not shown) so that the user's right eye is substantially centered in front of the rectangular viewing window area defined by cups 90A, 90B, 90C, and 90D of support top 84. Glass 112 also has a rim 113. In the above coupling between periscope 20 and viewing lens 112, cups 90C and 90F remain dangling, while cups 90A, 90B, 90D, and 90E are in vacuum contact. In particular, cup 90C is positioned in front of the nose of the mask user (not shown), but it is not in contact with the rubber body (not shown) of the mask. Conversely, as seen in FIG. 5L, when support top 84 is centered above the user's left-eye side, cups 90E and 90D remain dangling. This time, cup 90D is the one placed in front of the user's nose. Thus, regardless of the coupling, either to the left or to the right, there are always four cups in vacuum contact with glass 112. The additional two cups give the user of periscope 20 the versatility to choose the eye with best vision, if any. We used Ace® Hardware cups, model 51249, made by Ace Hardware Corporation, Oak Brook, Ill.; 2.7 cm or $^{11}/_{16}$" in diameter, if in vacuum contact.

The length of glass 112 of a typical adult mask (not shown) is about 15.2 cm, or 6". Any pair of consecutive suction cups, among the four bottom ones in a row, must always be separated by the same distance. Thus, since the diameter of the suction cups is 2.7 cm, and if we choose a maximum margin for error of about 1.5 cm, for the distance between either cups 90E and 90D, or cups 90C and 90F, then the distance between the axes of two consecutive suction cups is about 5.5 cm. Obviously, this is also the maximum recommended distance between cups 90A and 90B. For masks whose length is smaller than about 14 cm, or 5 ½", a smaller spacing is necessary between the cups. Such case, among others, is discussed in the next section. On the other hand, the width of class 112, for an adult mask, is about 7.5 cm. Thus, for the above type of suction cups, we prefer the axes of cups 90A and 90C (or 90B and 90D) to be separated no more than 4.5 cm, for a margin for error of at least 0.3 cm.

Given the above constraints for the separation of suction cups 90, given the above type of suction cups, and given that some rims 113, or portions of the rims, protrude above the plane of glass 112, the dimensions of T-shaped support top 84 are determined. For an adult mask, T-shaped support top 84 preferably has (a) a height of about 7 cm to hold cups 90A and 90C (or 90B and 90D); (b) a width (of the T-body) of about 8 cm; (c) an arms' length of about 20 cm to accommodate cups 90E, 90C, 90D, and 90F; and (d) an arm's width of about 2.5 cm.

Array of Adjustable Suction Cups
FIGS. 6A, 6B, 6C, and 6D

The size and shape of a diving mask can vary substantially according to the age of the user and the mask model. FIG. 6A is a perspective view of ancillary housing 76 whose rectangular support top 84 has four suction cups 90 (only two shown). Moreover, six slits 89 allow cups 90 to be flexibly positioned to mate with substantially any size and form of glass 112 provided that (a) the characteristic or typical length of glass 112 is larger than about 10.2 cm, but smaller than 15.2 cm, and (b) the characteristic width is larger than about 5.0 cm, but smaller than 7.6 cm. Note that we have disposed of cups 90E and 90F. Also, to the bolts (shown, but not numbered) of cups 90, a wing nut 92 is fastened to fix their position along slits 89. Thus, the thickness of the top shown in FIGS. 6A–6D is smaller than the one shown in FIGS. 5R and 5L. Also, the occasional problem of protruding rims 113 is absent, if top 84 is thin (about 2 mm), and made of polycarbonate, because such top is elastic.

In order to allow the user of periscope 20 to secure cups 90 using wing nuts 92, ancillary housing 76 has now a general pyramidal shape with a non-uniform rectangular cross-section, truncated at the base, where it joins lower housing 58 in a slanted manner. At its boundary with top 84, the cross-section of housing 76 is a square of side 5.1 cm, thereby defining a viewing window area on top 84 (indicated by dotted lines in FIGS. 6B, 6C, and 6D). Thus, behind support top 84, there is enough space to manipulate the wings of nuts 92. The bottom of this square cross-section is located substantially along the bottom edge of top 84. Passageway 74 of FIG. 4, not shown in FIG. 6, has the same shape and dimensions stated previously, but it is now the inclined base of truncated pyramidal ancillary housing 76. Obviously, housing 76 still has a plane of symmetry, the same one of lower housing 58.

FIGS. 6B and 6C show a front view of rectangular support top 84 connected to two different sight glasses 112 located behind such top. FIG. 6B shows underlying sight glass 112 of a typical size adult mask (not shown), while FIG. 6C shows underlying elliptical sight glass 112 of a typical small mask (not shown). The length of the major axis of elliptical glass 112 is 10.2 cm, or 4", while the minor axis's length is 5.1 cm, or 2", width of rim 113 excluded. In both FIGS., support top 84 is centered in front of the left eye (not shown) of the user. In FIG. 6B, cups 90 configure a rectangle, while in FIG. 6C they form a trapezoidal pattern. Also, in FIG. 6C, all four cups are positioned in front of the right eye side of the user's face.

The preferred dimensions of rectangular support top 84 are 17.8 cm×8.3 cm, or 7"×3 ¼". Slits 89 are arranged in two trios. Each slit is parallel to any of the others and to the smallest sides of rectangular top 84. Their length is 5.1 cm, or 2". Since slits 89 must accommodate the 3.2 mm (⅛") bolt of suction cups 90, the slit's width is about 4.8 mm, or ³⁄₁₆". The distance between two facing sides of each pair of consecutive slits 89 is about 9.0–9.5 mm, or about ⅜". A minimum margin of about 1.5 cm is always kept between each side of any such slit and the perimeter of top 84.

FIG. 6D shows a front view of support top 84, which has an improved pattern of guiding slits 89, attached to a diving mask whose sight glass 112 is panoramic or curved. Top 84 further includes an additional horizontal slit placed above the cross-section of the top with ancillary housing 76. This additional slit, about 4 cm long, is placed symmetrically with respect to the axis of symmetry of top 84, and allows the successful connection of the shown L-pattern of suction cups 90 on curved sight glass 112 of diving mask Aqua™, model EK-1510, not shown, made by Aqua Leisure Industries Inc. of Avon, Mass. The effect of this improved top 84 is the unexpected cooperation that arises from the rubber's flexibility of suction cups 90 and the polycarbonate's flexibility of support top 84 (0.16 cm thickness).

This cooperation decomposes or distributes the stress induced on top 84, by the curvature of sight glass 112, also among the base of suction cups 90. Thus, the coupling between sight glass 112 and top 84 takes place without significant bending of the top. By contrast, a similar test with a top made of 3 mm acrylic plastic failed consistently, either showing lack of vacuum contact to the glass in several of the cups or causing the top to fracture. Furthermore, for the purpose of simulating the presence of the ancillary housing, a 5-by-5 cm piece of relatively rigid 3 mm acrylic plastic was adhered onto the window area of an elastic 1.6 mm polycarbonate top. The presence of the rigid plastic did not prevent the suction cups to achieve vacuum contact with such glass.

We tested the ability of the adjustable cups of the support top of FIG. 6D to accommodate the range of sizes and shapes of 32 different commercially available diving masks models. We were able to position four cups within the boundary defined by the corresponding rim in 50% of the models, three cups in about 35% of the models, and only two cups in about 15% of the models. Since the size of the above sample is small, the above percentages can be generalized to the universe of all models only within an estimated statistical uncertainty or error of about plus or minus 10%. Hence, for very small masks, it is only possible to use two suction cups, while in the remaining 75%–95% of models, it is possible to use at least three cups.

Periscope Handles

FIG. 7A

FIG. 7A shows a pair of handles 95 connected to underwater housing 58 by a pair of brackets 95A, each having a pivot pin 95B to permit the handle to be folded into a vertical orientation by rotation about the pivot. Brackets 95A are connected to lower side walls 62, and are located close to bottom 68. Besides giving the user the feel of a real submarine's periscope, handles 95 also enhance control of the toy periscope mask because the user, at any time, can exert a force, directed toward the user's face, on the diving mask (not shown). Furthermore, this force facilitates to hold the suction cups in vacuum contact with the sight glass, particularly in fully submersible embodiments (discussed later), which are not subject to the same strength of the flotation force that acts upon partially submersible ones. This flotation force has a component directed normal to the glass. Later, when discussing the diving mask embodiment shown in FIG. 10E, and to improve the coupling when only two suction cups are in vacuum contact, we provide another way to supplement such coupling, in addition to the flotation force and the force exerted by the user when using handles 95.

Using the Periscope Mask in a Pool

FIGS. 3, 7A, and 7B

To couple the mask to the periscope, the user (a) puts on the diving mask as usual, (b) goes into the pool until the water surface is approximately at his chest, (c) centers the viewing area of the ancillary housing in front of his or her preferred eye, (d) with one hand holding the bottom of the underwater housing, the user exerts pressure upon such bottom against the mask's glass until all the cups are in substantial vacuum contact, and (e) goes underwater, and using both periscope's handles, the user further improves the vacuum contact until judged satisfactory. The quality of the coupling can be inferred (1) according to how the cups' bottom look, when seen through the sight glass, and (2), according to whether or not, the periscope mask feels properly connected. Steps (c), (d) and (e) are repeated until a satisfactory coupling is attained.

FIG. 7B is a sketch of a side view of the aquatic toy of the present invention, when it comprises the above partially submersible periscope coupled to a diving mask 110, being used by a child that lays substantially horizontal while swimming in a water reservoir. Obviously, the user should always wear a snorkel (not shown). Ancillary housing 76 of the embodiment shown has a uniform rectangular cross-section. An anatomic parameter of periscope 20 is the angle formed by the head of the above swimmer (choosing a suitable axis along the head's spinal cord) and a line normal to the water surface. Observations made by us on few subjects suggest that this angle is typically about 60°–70°, for the head to be oriented in a comfortable position with respect to the backbone, during a sustained period of time. We want wall 64 to be approximately perpendicular to a still water surface when the user's body lies in a substantially parallel position to the surface. Thus, the above angle equals the complementary angle between outlet rear wall 82 of ancillary rectangular housing 76 and lower rear wall 64 of lower pyramidal housing 58 (FIG. 7A). In summary, the angle of the V-shape of underwater housing 56 is about 25°; in our prototypes, we used 30°. Having determined the angle of the V-shape, the angle of bottom 68 with respect to top 28 is fully specified by the geometry of periscope housing 22 (see FIG. 3).

Another feature determined by the user's anatomy is the length of ancillary housing 76, which must be large enough for the most forward and upward part of the head of the periscope's user not to touch rear wall 64 of lower housing 58. A distance of about 12 cm between the common edge of support top 84 and outlet front wall 78, on one hand, and lower rear wall 64, on the other hand, measured along the plane defined by support top 84, is large enough to accommodate a typical adult's head, provided the angle of the V-shape equals 30°.

Finally, the combined length of pyramidal housings 40 and 58 must be specified so that upper housing 24 protrudes above the water surface, when the user is surface swimming (see FIG. 3). More specifically, front aperture 43 must protrude above the water surface. For partially submersible embodiments, we prefer the length between the common edge of bottom end 68 and lower rear wall 64, and the top edge of upper rear wall 46, to be about 40 cm.

For fully submersible embodiments, discussed next, we prefer such length to be about 50 cm.

In both cases, we estimate that strict lower bounds for such length are 35 cm and 45 cm, respectively. On the other hand, the dimensions of mirrors 29 and 70 are determined as a function of the angular fields of view, the length of ancillary housing 76, and the combined length of housings 40 and 58. The largest width of upper housing 40 substantially equals the width of mirror 29. We estimate that the horizontal angular field of view is preferably in the 25°–30° range. Our prototypes have a 20° view, which is the minimum value we prefer for the horizontal angular view. On the other hand, we estimate that the vertical angular field of view is preferably in the 5°–10° range. In our prototypes we used 10°; we prefer the vertical angular field of view not to exceed this value. In summary, we have completely determined the geometry of housings 24 and 56 as a function of the anatomy of the user and the intended use of periscope 20 as part of the periscope mask toy of the present invention. The embodiments so far discussed are partially submersible.

Fully Submersible Embodiment
FIGS. 8A and 8B

FIG. 8A shows a cross-sectional side view of a periscope embodiment of the periscope-mask toy of the present invention whose lower or underwater housings become fully flooded when submersed. FIG. 8B shows the corresponding perspective front view, further comprising an ancillary target 108A. Housing 22 of this embodiment is substantially identical to the periscope housing shown in FIGS. 1 to 4, except for the following modifications: (a) lower front wall 60 has a flooding aperture 61 located close to bottom end 68, (b) upper pyramidal housing 40 further comprises a transparent bottom wall 52, integrally formed thereto, and orthogonal to both upper rear wall 46 and the plane of symmetry of periscope housing 22, (c) the inclination of slanted window 48 is preferably of about 10° below the horizontal, if the rear walls are approximately vertical—for clarity, the inclination shown is larger than 10°, (d) there is an air draining hole 65 located at lower rear wall 64, close to transparent wall 52, (e) there is another air draining hole 83 located at outlet rear wall 82, close to support top 84, and (f) the plane defined by boundary 54 substantially coincides with transparent wall 52. Additionally, each sloping side wall 32 has an elongated hole 32A, thus being substantially void. Also, there is a circular orifice 63 in one of the side walls 62 to connect ancillary target 108A, which can also be made so that it is connected to rear aperture 47, instead. Also, receptacle 100 further comprises a vent pipe 105. We discuss the function of orifice 63 and basket 108A in the next section.

When periscope 20 is partially submersed in water, so that upper housing 24 remains above the surface, apertures 61, 65, and 83 allow lower underwater housing 56 to fully inundate, without substantial trapping of air initially present therein. Transparent wall 52 provides a flat, substantially distortion-free, air-water interface between underwater housing 56 and surface housing 24, provided it is suitably positioned so that it lies below the water surface when the user is surface swimming wearing the periscope mask. Thus, we prefer the distance between transparent wall 52 and the bottom edge of bottom end 68 to be about 35 cm so that the user of periscope 20 has a substantially undisturbed view of the action taking place above the water surface. The residual flotation force present in fully submersible embodiments is the one caused by the air space located between slanted window 48 and transparent wall 52.

If the periscope mask user fully submerses front wall 42, upper pyramidal housing 40 becomes flooded. Once housing 40 has resurfaced, the water in such upper housing is drained through front aperture 43 toward receptacle 100. The user wants to fully inundate upper housing 40 in order to load such receptacle with water for later use as ammunition for a suitable streaming mechanism (not shown) connected to pipe 105.

Apertures 61, 65, and 83 have suitable plugs or stoppers (not shown) so that the above fully submersible embodiment has the versatility of being used either in a partially submersible or a fully submersible mode. The walls of the lower housing are preferably made of polycarbonate, about 2 mm thick. One can also make most of them substantially void, like a fabric, frame, structure, or chassis. In any case, to preserve the geometrical optics, the housing structure should always be made of a material, like polycarbonate, not susceptible to irreversible or inelastic deformations caused by inadvertent bending.

Accessories: Ancillary Basket and External Pipe
FIGS. 8B and 8C

FIG. 8B shows ancillary basket 108A coupled to circular hole 63 shown in FIG. 8A. When perforated spherical shells (not shown), like the ones used for practicing golf, enter basket 108A, they end on top of mirror 70 (see FIG. 8A). After a handful of shells deposit on top of mirror 70, the user is completely disabled from viewing the action above the water surface. We prefer shells whose diameter is about 4 cm, preferably orange, to facilitate its location under water when they miss their target. Accordingly, the minimum diameter of basket 108A must be about 4 cm or larger.

Likewise, the width of rear aperture 47 should also be about 4 cm or larger, if basket 108A is suitably made to be connected to the rear aperture, instead. FIG. 8C shows a conduit or pipe 108B that externally connects housings 40 and 58: hole 63 (FIG. 8A) of underwater housing 58 is connected by pipe 108B to another hole (not shown) located in the corresponding side wall 44 of upper housing 40. Thus, toy projectiles entering, either through inlet opening 38, or through the ancillary basket connected to aperture 47, will probably end on top of the bottom mirror. It is reasonable to expect the likelihood of such event to be relatively high when (a) upper housing 24 has already received several toy projectiles, and (b) when upper wall 42 is fully submersed, because water entering upper pyramidal housing 40 will stir the toy projectiles trapped in such housing, increasing their chance of entering pipe 108B. In conclusion, when using pipe 108B, toy projectiles covering the slanted window may further impair visibility in a staggered manner, by randomly descending from the surface housing to the underwater one.

When the ancillary target is connected to the rear aperture of the upper housing, it can further comprise a water-actuated ball-dispenser mechanism (not shown) that releases perforated balls that end on top of the transmission window, as it is progressively hit by water shots from other players. The perforated balls can be throw at the ancillary target by other underwater players or by ground players located in the pool's surroundings. Alternatively, they can be present in the ancillary target ab initio, in a suitable compartment (not shown) of such target. The design of such mechanism is a trivial matter; therefore, we only describe its main components. It comprises a water container that can only be displaced vertically (no rotation or motion along other directions), a stretching or compression mechanism that controls the displacement of the container, and a paddle wheel whose axis has a fixed direction with respect to the ancillary target, but otherwise it is free to rotate around such axis. The water container stores water shots from other players. A rubber band, a spring, or other suitable compression or stretching mechanism controls the displacement of the water container with respect to the ancillary target as the container becomes full with water. The rotation of the paddle wheel is controlled by a suitably spaced sequence of teeth, vertically arranged, that protrude from the wall of the water container. The paddle wheel, whose axis is oriented perpendicularly to the line sequence of teeth, can have, at any time, one or two perforated balls trapped between its blades. Obviously, when the paddle wheel is it rest, there is at least one blade of the paddle whose outermost edge is trapped between two consecutive teeth. At some moment, as the water container moves downward, the currently trapped blade is released, so that a perforated ball can fall toward the rear aperture. The paddle achieves a new state of rest when the next blade is trapped between the next pair of consecutive teeth. With a typical rubber band, of about 0.5 cm width, the typical displacement of the water container is about 4 cm, when it is filled with 250 ml of water. Thus, assuming a 5 mm spatial period for the teeth sequence, one can have at least eight balls going through such mechanism. Finally, the container is always in contact with a break mechanism, whose function is to provide friction to dissipate the irregular oscillations of the container induced by the random forces acting upon it that originate from the non-inertial nature of the periscope housing, when used as a frame of reference for the motion of such container. Such friction is small enough to allow the container to be displaced downward by its monotonically increasing weight, but large enough to damp such oscillations quickly, thereby preventing undesired releases of the balls. The advantage of this ball-dispenser mechanism is that it is water-actuated; it is easier to aim a water stream than a sequence of manually thrown balls, if the underwater user that does the shooting is wearing the periscope mask.

Hence, the ancillary basket can be made so that it can be connected either to the side or to the rear of upper housing 24. It can be reached from any direction, if its top is located at about the same height than the top edge of top end 28, while inlet opening 38 can only be reached within a 180° sector. On the other hand, inlet opening 38 is better than basket 108A at receiving toy projectiles whose trajectory is substantially rectilinear, as when shot by a toy gun. We prefer periscope 20 to comprise the ancillary basket and the external pipe as accessories. Furthermore, we prefer such ancillary basket to further comprise such water-actuated ball-dispenser mechanism. Finally, the additional hole (not shown) of upper housing 24 should have a plug or other suitable locking or stopping mechanism so that the water trapping function of such housing is preserved when the external conduit is not connected to the housing.

Water Receptacle as Scoring Means and Water Supply

FIGS. 2 and 8B

FIG. 8B also shows that water receptacle 100 may further comprise a lockable aperture 103 and vent pipe 105, which allows a flexible tube (not shown) of a suitable streaming mechanism (not shown) to be connected to the water receptacle. Thereby, receptacle 100 may also work as a water supply to the streaming mechanism. We prefer such streaming mechanism to be similar to the usual trigger-actuated, plastic pump that comes on top of plastic bottles used for spraying. When periscope 20 resurfaces after a full submersion of upper housing 40, lockable aperture 103 allows water to drain from upper housing 24, if aperture 103 is in an open position. Aperture 103 must be located in front of, and slightly below, aperture 43. In order to introduce a time delay of several seconds, after resurfacing and until the slanted window is completely cleared, we prefer the diameter of aperture 103 to be about 0.5–1.0 cm. On the other hand, when lockable aperture 103 is in a closed position, receptacle 100 works as a cumulative water collector. Thus, the top of pipe 105 must be at the same height of the top edge of upper front wall 42. In this case, the streaming mechanism is connected directly to the pool's water. Thus, it is not connected to the vent pipe, but suitably attached to the periscope housing. Also, note that locking arrows 101 (FIGS. 2, 3, and 8) are made so that there is no water leakage from upper housing 40 to the outside of periscope housing 22, when water is going from the upper housing toward water receptacle 100.

A plurality of lockable apertures of different diameters can be provided to allow players to select the appropriate extent of the above time delay, according to their playing skills. Receptacle 100 preferably has a capacity of about 250 ml to induce frequent water reloading, when used as a water supply. A typical trigger-actuated pump needs about 100 shots, or a time interval of about two minutes at a rate of about one shot every second, to consume such amount of water. Otherwise, when receptacle 100 is used as a water collector, we prefer such capacity to be about 500 ml. Thus, the periscope preferably has an additional receptacle (not shown), with the ability of being connected to the former one, so that their total capacity is about 500 ml.

Accessory to Increase Difficulty of Battle Games

FIG. 9A

FIG. 9A shows a removable and rectangular blocking screen 94A with holes shown congruent with the holes where cups 90 are screwed to T-shaped top 84. Obviously, rectangular tops with slits can also use a blocking screen, provided that the screen's holes are now elongated, and congruent to the top's slits. Screen 94A is made of a plastic, opaque material, except at its center, where there is a viewing window area 94B. Hence, screen 94A is intended to substantially block the underwater view, thereby increasing the difficulty of any game played with the periscope because the lack, in particular, of peripheral underwater visibility, which makes it more difficult to locate enemy players. Its thickness is preferably of about 1 mm. By suppressing underwater visibility, this screen also makes the player more aware of his or her weightless condition.

Accessory: Convoy Ship

FIG. 9B

FIG. 9B shows a floating toy target 99 attached by a string 97 to a removable mast 96, which is connected to either one of the side walls of underwater housing 58. The string's length is about 40 cm. Side walls 62 further comprise a pair of mast supports 69, one pair per side, into which removable mast 96 can be inserted. The function of floating toy target 99 is to be a water target for the streaming mechanism of opposite players. Note that mast 96 allows target vessel 99 to be within hand reach of the periscope's user. Furthermore, since it is removable, the player may remove mast 96 from the corresponding mast support in order to leave target 99 temporarily unescorted when pursuing another player. Thus, mast 96 floats, when decoupled from the periscope. We prefer a capacity of about 500 ml for floating toy target 99. Finally, mast supports 69 can also be made so that the player can attach the streaming mechanism (not shown). Therefore, although the streaming mechanism and its flexible tube also float in water, the user can place the streaming mechanism in either support 69, thereby not only freeing his or her hands for swimming, but also facilitating the location of the mechanism afterwards. Also, additional supports may be added to hold other toy guns.

Prow to Facilitate Navigation
FIG. 9C

FIG. 9C shows a variant of water receptacle 100, which is identical to the water receptacle shown in FIG. 8B except for its prow shaped form, which facilitates the user of the toy periscope to move forward more efficiently. Note that the lower front wall of the underwater housing can have a prow shape as well, with the receptacle integrally formed to the wall. The use of prow shaped receptacle 100 is preferred for embodiments whose underwater housing has walls that do not have large voids. Otherwise, for embodiments whose underwater housing is a structure with substantially void walls, one may also use a flat water receptacle located parallel to one of the side walls of the underwater housing.

Mask and Periscope Integrally Formed
FIGS. 10A and 10B

FIG. 10A shows an exploded perspective view of the new aquatic toy of the present invention where the toy periscope is integrally formed to the mask. Besides sight glass 112, rim 113, and a mounting frame 114, which is secured to rim 113, diving mask 110 typically comprises a generally tubular rubber body 122. The sight glass shown is integrally formed to the rim. Specifically, in this embodiment, support top 84 of ancillary housing 76 is integrally formed to sight glass 112 of diving mask 110. More specifically, walls 78, 80, and 82 of ancillary housing 76 are integrally formed to sight glass 112, and protrude outwardly from the glass. Front wall 78 protrudes from that part (not shown) of the sight glass that follows the contour of the nose. Thus, wall 78 is not flat, particularly near the sight glass. The surface region contained within the boundary defined by the cross-section between the walls of housing 76 and sight glass 112 should always be embedded in a rectangle whose minimum dimensions are 7.6 cm×2.6 cm, approximately. In the case of FIG. 10A, the embedding rectangle is a 7.6 cm×7.6 cm square. Obviously, this embedding rectangle should always be suitably centered in front of the expected position of the user's eyes.

FIG. 10B shows a perspective view of another embodiment of the new aquatic toy of the present invention where the diving mask and the toy periscope are also integrally formed. Specifically, mounting frame 114 is integrally formed to ancillary housing 76, whose side walls have been replaced by a pair of side strips 81 that integrally form mounting frame 114 to side walls 62 of underwater housing 58. Also, each strip 81 has an angular shape that allows insertion of the sight glass and rubber body into mounting frame 114 during the usual assembly procedure for the diving mask. Again, all housings should be made of a plastic not easily prone to inelastic or irreversible deformations, specially if their walls define an open structure (as opposed to a closed housing).

Alternative Embodiments: Mask with Guiding Grooves
FIG. 10C

Another way to embody the new aquatic toy of the present invention is shown in FIG. 10C, which shows an exploded isometric view of support top 84 of the periscope, on one hand, and sight glass 112 and mounting frame 114, which further comprises two pairs of guiding grooves 115 (each pair having a lower and upper groove). Each pair mates with support top 84, which is now an irregular hexagon of substantially rectangular shape that covers about half of glass 112. In this embodiment, support top 84 does not have either suction cups or guiding slits. Furthermore, each pair of guiding grooves further comprises at least one flexible locking slip 117 that constrains top 84 to stay fixed in position once inserted into one pair of grooves 115. Also, each lower groove 115 is curved upward at that point thereof that is located substantially in front of the user's nose. The rubber body is not shown.

Preferred Mask and Support Top
FIGS. 10D and 10E

When discussing support top 84 shown in FIG. 6D, we stated that only two suction cups 90, of the four provided, could be connected to sight glass 112 in roughly 15% of the commercially available diving masks models. Obviously, such masks tend to be the ones used by small children. In this case, the reliability of the coupling between mask and periscope of the new toy of the present invention can be enhanced by using a periscope whose support top 8 4, shown in FIG. 10D, is coupled to a diving mask having mounting frame 114 shown in FIG. 10E. This is also convenient to those children that may have difficulty in the implicit learning of the motor skills involved in the use of the periscope handles in order to keep the periscope coupled to the mask, even if more than two suction cups are used, specially if the periscope mask is fully submersible.

Support top 84 of FIG. 10D is the same one shown in FIG. 6D, except for the addition of one more horizontal slit 89 suitably located below the viewing area (thus, the support's width is correspondingly increased). On the other hand, in FIG. 10E, mounting frame 114 further comprises a pair of flat downside protuberances or flanges 119, coplanar to sight glass 112. The rubber body is not shown. Each flange 119 further comprises one guiding groove 121. Such groove must be congruent to the additional slit of the support top. Obviously, the top can comprise a plurality of additional, suitably placed grooves or slits parallel to the extra slit shown.

If the suction cups are of the brand and model previously indicated, the distance between the plane defined by the forwardly facing surface of flanges 119 and the plane defined by the likewise facing surface of glass 112 must be equal to the height of the suction cup (measured along the axis of its bolt), minus the protruding length of its bolt. Obviously, such height is the one measured when the cup is in vacuum contact. In this way, and provided that the glass rim does not protrude beyond flanges 119, one can supplement the coupling provided by the suction cups with a suitable wing nut and a bolt placed through either groove. As the child grows up, she or he will be able to use masks coupled to the toy periscope by three or four cups. Thus, for small children, we prefer partially submersible embodiments because (a) they are easier to control (flotation force facilitates the coupling), and (b) they also help the flotation of the user.

Alternative Embodiments for the Periscope Housing
FIGS. 11A and 11B

FIG. 11A shows periscope 20 where periscope housing 22 has a uniform rectangular cross-section along housing 56. FIG. 11B shows periscope 20 where periscope housing 58 has a non-uniform rectangular cross-section, but parallel front and rear walls, and a trapezoidal top mirror. Therefore, the angular vertical field of view is 0°. The advantage of these embodiments is the simplicity of the periscope housing.

Games Played with the Periscope Mask
U-boat and Destroyer Roles

Partially submersible periscopes allow a child to play the role of destroyer, while fully submersible ones are preferred for the role of U-boat. When the toy mask periscope is used in such roles, we prefer the periscope to further comprise the ancillary target with the water-actuated ball-dispenser mechanism that comprises ab initio a set of perforated balls, and that can be connected to the rear aperture of the upper housing. When a fully submersible embodiment is used in U-boat mode, (a) such ancillary target is coupled to the rear wall of the upper housing, which is in turn connected to the lower housing by the removable and external conduit, (b) the streaming mechanism is connected to the water receptacle, (c) the draining aperture of the water receptacle is set in an open position, and (d) the player wears flippers. Otherwise, when a fully submersible embodiment is used as a partially submersible one in escort or destroyer mode, (1) the ancillary target (without perforated balls) is connected to the upper housing, but the upper housing is not in conduit connection to the lower housing, (2) all lockable apertures of the upper housing are set in a close position, (3) the streaming mechanism makes direct use of the pool's water, as opposed to the receptacle's water, (4) the blocking screen is placed between the support top and the diving mask, and (5) the player does not wear flippers. Furthermore, destroyers escort suitable floating targets connected by a string to a flexible, light, and removable mast attached to the periscope. All floating targets are potentially sinkable by the streaming means of the U-boats. The above definitions for such roles can be changed as desired, they are only one example among many possible ones.

Whenever a player in destroyer mode comes close to another one in U-boat mode, such destroyer will shoot water at the ancillary target of the U-boat, and conversely, whenever a player in U-boat mode comes close to another one in destroyer mode, such U-boat will shoot water at the inlet opening and the ancillary target of the destroyer. Once a handful of perforated balls accumulate on top of the bottom mirror and the slanted window, the U-boat player cannot aim his streaming mechanism. Thus, the U-boat has to withdraw from the game. On the other hand, a destroyer is sunk when its slanted window becomes fully covered by water.

After few attacks using its streaming mechanism, the U-boat will run out of water. Thus, it has to submerge its upper housing in order to load the receptacle, thereby mimicking the time lag of manual load of all torpedo tubes. Also, when U-boats resurface, the draining aperture of the water receptacle has a diameter small enough for the water located above the slanted window to take several seconds to drain, thereby making them temporarily vulnerable. This brief time window allows destroyers either to move forward to destination, or to advantageously attack the temporarily defenseless U-boat. These disadvantages of the U-boats are partially compensated by the lack of flippers and underwater visibility of the destroyers. One variant of the U-boat role is when the perforated balls are not present in the ancillary target ab initio, but are throw at it, either by ground players located in the pool surroundings (working in cooperation with the destroyers) or by the destroyers themselves.

In what follows, we outline two examples of sea battle games, based upon the above defined roles of destroyers and U-boats, that illustrate how a group of children can use the toy periscope mask of the present invention to play sea battle games. The examples given are inspired in actual sea battles of W.W.II: The Invasion of Norway and The Battle of the Atlantic.

Games Played with the Periscope Mask
The Invasion of Norway

When played in a rectangular swimming pool (not shown) by two teams (not shown), at least two players per team, this game is as follows: Each team has at least one player in fully submersible mode (submarine), and at least one player in partially submersible mode (destroyer). Initially, destroyers are located at two consecutive corners (England and Germany) of one side of the pool. Their goal is to escort successfully as many floating toy targets (troop transports) as possible to the opposite side (Norway) of the pool (North Sea). On the other hand, submarines of each team are initially located at the midpoint of the pool side that does not have any corner in common with the corner of departure of destroyers of the opposite team. Thus, each group of submarines faces the other located in the opposite pool's side. Their object is to sink the destroyers and the troop transports escorted by them. The winner team is the one having the largest number of toy targets arriving to Norway, the smallest number of destroyers sunk, and the smallest number of submarines sunk, considered in that order in case of a tie. Ancillary rules are, for example, that one destroyer can "rescue" a troop transport whose destroyer has been sunk. Thus, such unescorted transports can also be sunk by the submarines. Furthermore, both ground players and destroyers can throw perforated balls at the ancillary target of the U-boats.

Games Played with the Periscope Mask
The Battle of the Atlantic

When played in a rectangular pool (not shown), at least one player per team (not shown), this game is as follows. One team uses the mask periscope in destroyer mode. Each destroyer escorts at least one mobile toy target (cargo vessel) to be transported from one side of the pool (North America) to the opposite side (England). The other team, initially located at such opposite site, uses the periscope mask in U-boat mode. The game is over once all cargo vessels have either been sunk or have arrived to destination. The game is played again with the roles reversed. The winner team is the one that delivered the largest number of toy transports to destination, with the least number of ship losses.

The above games can be used as models to define other battle games inspired, for example, in the Invasion of Normandy. In such game, players that cannot swim use the periscope on the ground as a sighting device to shoot water at players in the pool. They can also throw perforated balls at the ancillary target of the U-boats (instead of the balls being present in such target since the beginning of the game).

Conclusions, Ramifications, and Scope.

Accordingly, the reader will see that our new aquatic toy comprises an improved toy periscope coupled to a diving mask, or alternatively, an improved diving mask and an improved toy periscope that are either removably connected or integrally formed. Our toy periscope mask can be used by persons with swimming ability to play enticing sea battle games. Furthermore, the periscope is coupled to the diving mask in a practical, convenient and reliable manner: (1) In all the embodiments provided, the corresponding coupling means allow the user to see not only through the optics of the periscope, but also through the mask, toward his or her underwater surroundings, (2) the periscope mask is substantially stable against unpredictable motions of the user, typical in the midst of a chaotic battle, (3) a child can easily learn how to fasten the periscope to the mask, (4) the periscope mask is ergonomically sound because the angle of its characteristic V-shape is congruent to a comfortably bent position of the swimmer's neck, and (5) the periscope has the versatility to be suitably centered on top of the mask's sight glass, in front of the eye with best sight. In spite of substantially having all these advantages and flexibility, all the toy periscope masks shown are remarkably simple with concomitant comitant ease of use.

Partially submersible embodiments are preferably made of a transparent material, like polycarbonate. Thus, the user also gets underwater visibility through the same eye that sees above the surface. Furthermore, partially submersible embodiments facilitate the flotation of the user. Such flotation also facilitates the periscope mask coupling. This is particularly convenient to small children with basic swimming and motor skills. Moreover, the periscope optics of all embodiments can be made so that it gives an acceptably wide field of vision around near objects, without including the walls of the periscope as part of the image. When the exterior of a periscope wall includes support means for a suitable toy gun or water streaming mechanism, the player is not limited in his or her swimming ability when not using them.

Furthermore, the toy periscope mask has additional advantages in that it provides a reasonably priced periscope mask for use as a toy;

it provides a toy that gives instantaneous feedback to its user when hit by shots from an opponent in suitable aquatic battle games;

it can be sold as a do-it-yourself toy, where the user assembles the periscope part of the toy, thus, in addition to its educational value, the manufacturer saves in assembly costs;

its novelty is likely to appeal to both children and adults; and, given all the above benefits and advantages, it enhances the value, scope, and use of diving masks.

While our above description contain s many details, these should not be construed as limitations on the scope of the invention, but rather as an exemplification of the embodiments thereof. Many other variations are possible. For example, the aspect of the periscope housing can be varied by changing not only the angular fields of view, but also the combined length of the pyramidal housings. Moreover, all the comers of the periscope housing should be rounded. Also, the housings can have other type of cross-sections, besides the rectangular and trapezouidal ones shown. For example, they can have a hexagonal, or other polygonal cross-section, as well as an elliptical one. The dimensions of these cross-sections may change at different positions in the housing (non-uniform cross-sectional areas). Also, a change in the shape of such cross-section entails concomitant changes in the shape of the optical elements. In general, in the appended claims, we shall refer to all the above instances of cross-sections by the term tubular.

The angle between the ancillary and lower underwater housings, and the angle of the bottom mirror with respect to the top on can be made adjustable, specially if the underwater housing is fully submersible. This allows the user to better customize the periscope's geometry to his or her particular idiosyncrasy. Accordingly, the dimensions of the mirrors should be adjusted so that the range of variation of the above angles is reasonably large. The structures needed to accomplish the above changes are simple and well known. Furthermore, the user has to select all the above angles in order to get the periscope to function properly, such versatility having educational value. Also, they are likely to be more appealing. Finally, the V-shape of t he housing can be varied, to get, for example, an L-shape that allows the user's body to be in a substantially vertical position while observing events taking place above the water surface.

The housing's walls of fully submersible periscopes can have surface voids of substantial size, as opposed to the few small orifices we have shown. For example, all the walls can be replaced by a frame, chassis, or fabric that still provides the structural support needed for all the optical elements and coupling means, but which reduces substantially the amount of material used. Also, such housing structure with substantially hollow walls facilitates the navigation of the periscope, if the (flat) water receptacle is placed in the location of one of the former side walls. However, it is important to ensure that the periscope housing is both elastic and robust so that the periscope optics is not corrupted by inelastic or irreversible deformations. Thus, polycarbonate is our preferred material.

The residual flotation force in fully submersible embodiments is null, when the space between the slanted window and the transparent bottom window of the upper housing is inundated by opening a suitably located valve. In this case, underwater navigation of the periscope mask becomes feasible. When resurfacing, and in order to dislodge the water trapped in the space between the above windows, a suitable trigger-actuated pump must be provided. Initially, most of the water is expelled through the open valve, if the periscope is properly oriented by the user, for gravity to dislodge such water. The residual water is then extracted by repeated use of the pump. Finally, the valve is manually closed by the player. This procedure adds an enticing degree of complexity to the operation of the periscope mask in U-boat mode.

In order to facilitate the underwater navigation of such fully submersible embodiment, one can modify the upper housing by making its top wall pivotable. A suitable float (not shown), integrally formed to the top wall, rotates such wall until it is parallel to the current direction of underwater motion of the player. The corresponding pivot (not shown) is inserted into two recesses (not shown) of the sloping side walls. Each recess is located at the uppermost vertex of each side wall. Thereby, when the periscope is submersed, the flotation force will exert a torque upon the top wall. If the float is made so that the total torque exerted by the gravitational and flotation forces upon the top, with respect to the pivot, is null, then the orientation of the top (as specified by an orthogonal line thereto) will tend to be perpendicular to the swimmer's direction of motion, with the concomitant reduction in the drag force acting upon the upper housing. Obviously, in order to support the top wall and its mirror, each sloping side wall must have one elongated tread (not shown) running along each of its boundaries with the top wall. After resurfacing, the top wall rests on top of such tread.

The only requisite we impose upon the ancillary housing, besides its length and angle with respect to the underwater housing, is that of providing structure to connect the coupling means (to a diving mask) to the lower underwater housing. We have shown an ancillary housing with rectangular cross-section and a T-shaped support top. Also, we have given an ancillary housing with a non-uniform rectangular cross-section and a support top of rectangular shape. These housings are closed structures, but open ones will work as well for fully submersible embodiments. For example, one can eliminate the rear wall of the above ancillary housings, or substitute the side walls by bands or strips (preferably bridged), as we did in the embodiment where the mounting frame of the mask is integrally formed with the ancillary housing.

Furthermore, the ancillary housing of fully submersible embodiments can be removable, instead of being integrally formed to the underwater housing. Likewise, its support top can be removable. Also, support tops can take several polygonal shapes, besides the rectangular, irregular hexagonal, and 'T' shapes shown. The elongated holes or slits of the support top can form many different patterns, besides the ones given, that will accomplish the same goal of providing a versatile coupling to substantially all diving masks. Support tops can have guiding grooves and locking slips to provide coupling means to a diving mask. For example, the mask's mounting frame can have both downwardly and upwardly protruding edges that mate with guiding grooves of the ancillary housing's support top. These edges are restrained by the locking slips of the support top. Locking slips can be substituted by any other type of locking means, like for example, locking pins. Support tops may further comprise griping, locking, fastening, snapping, and clamping means connected to suitable flanges, protuberances, salients, buckles, snaps, and the like of the mounting frame of the diving mask. Support tops (of the periscope) and suitable mounting frames (of the diving masks) can be connected by suitable nuts and bolts.

Support tops may comprise a multitude of uniformly distributed circular perforations, the diameter of such perforations being equal to the diameter of the cup's bolt, such perforations spaced as closely as possible without compromising the structural stability of the top. Support tops may also consist of closely spaced, parallel slits orthogonal to the trios shown in FIGS. 6A–6D. Other orientations will do, as well. The support tops can be curved surfaces, to be attached to curved masks. Also, the wing nuts of the suction cups can be orange.

The given toy periscope mask comprises a set of optical elements: a top mirror, a slanted transparent window, a bottom transparent wall in the upper housing, and a bottom mirror. More sophisticated optics, well known in the art, can be further included (prisms, lens, and the like). Approximately, the angle of the slanted window can be approximately varied between 0° and 45°, particularly if the periscope is partially submersible. For fully submersible embodiments, we prefer a more narrow range of variation. Such slanted window can be integrally formed to the upper housing, instead of being removable.

The water receptacle can be either opaque or transparent, removable or integrally formed to the periscope housing, flat or prow shaped, rectangular or trapezoidal, etc. The lockable aperture of the water receptacle can be positioned in the front wall of the upper housing, instead. The capacity of the receptacle can also be varied: (a) the smaller the capacity, the higher the rate of submersion and resurfacing for players in U-boat mode, and vice versa, (b) the larger the capacity, the longer the time needed to obstruct the view of periscopes in destroyer mode. Thus, modular or stackable receptacles are preferably provided. An alternative embodiment for the water receptacle further comprises a suitable float connected to an opaque screen contained within the receptacle so that when the receptacle gets progressively filled with water, the screen is displaced upward. If the receptacle has an opening at its top, such screen will protrude above the receptacle, thereby intercepting light rays directed at the inlet opening. Further accessories of the toy periscope mask may include: (a) a multitude of toy projectiles, besides punctured spherical shells, like suction cup darts, loaded water balloons, balls, rubber tipped shuttlecocks, toy torpedoes, and the like, and (b) different types of shooting means, like water guns, suction cups, dart guns, ball guns, water balloon launchers, and the like. The periscope housing may further comprise a water gun or other type of toy gun attached to the housing so that the shooting direction is not controlled by hand, but by the orientation of the periscope housing. Also, the housing should have removable insignia to identify players of the same team. The aquatic games that can be played with the toy periscope mask are numerous, not restricted to the examples given.

Finally, many other substitutions, additions, deletions, permutations, and other modifications are possible without departing from the essential structure and operation of the invention. Accordingly, the scope of the invention should be determined, not by the embodiments illustrated and the examples given, but by the appended claims and their legal equivalents.

We claim:

1. An aquatic toy comprising a toy periscope that a user can connect to and disconnect from a diving mask,
    said toy periscope including
        a periscope housing having a tubular V-shape structure, the length of one arm of the V-shape being different than the length of the other arm, said periscope housing having an inlet opening located at the end of the longest arm thereof,
        a top reflection means and a bottom reflection means for reflecting light, said top and bottom reflection means being connected to the housing, said top and bottom refletion means being located within the housing, said top reflection means being located near the inlet opening, said bottom reflection means being located near the vertex of the V-shape, and
        a support top connected to the housing at the end of the shortest arm of the V-shape thereof, said support top including coupling means for removably coupling said toy periscope to said diving mask, said coupling means being connected to said support top, said support top having a predetermined structure so that, when said user is surface swimming horizontally while wearing said toy periscope coupled to said diving mask, said user has simultaneous underwater and surface visibility,
    whereby said user has the freedom to choose said diving mask among many different types of diving masks, said user has the freedom to use said toy periscope either connected to or disconnected from said diving mask, and said user, while so swimming, can participate in aquatic games which action takes place above the water surface and underwater.

2. The aquatic toy of claim 1 wherein said coupling means comprises a plurality of suction cups.

3. The aquatic toy of claim 1 wherein said coupling means comprises a plurality of grooves.

4. The aquatic toy of claim 1 wherein said predetermined structure of said support top is made of a transparent material.

5. The aquatic toy of claim 1 wherein said predetermined structure of said support top has a T-shape.

6. The aquatic toy of claim 1, further comprising a slanted transparent window, said slanted transparent window located within said periscope housing across the longest arm of the V-shape thereof so that said slanted transparent window partitions said periscope housing into an upper or surface level housing and a lower or underwater level housing, thereby the slanted transparent window prevents water shots that may enter into the upper housing from covering the whole window and from reaching said bottom reflection means, so surface visibility is not immediately impaired by the water shots, said lower housing being impermeable so that water cannot enter the lower housing when it is substantially submerged, said slanted transparent window being sealably connected to said periscope housing so that water that enters the upper housing through the inlet opening cannot flow from the upper housing into the lower housing, said periscope housing further comprising a pair of handles attached thereto near the vertex thereof, whereby said user can play aquatic battle games of suitable duration, for the surface visibility is not immediately impaired by the water shots.

7. The aquatic toy of claim 6, wherein said periscope housing further comprises a conduits said conduit having a first open end and a second open end, said first open end coupled to said upper housing, said second open end coupled to said lower housing, so the lower housing functions as a scoring mechanism because toy projectiles entering the upper housing have a finite probability of entering the lower housing where the toy projectiles accumulate on top of the bottom reflection means so that surface visibility is progressively impaired, whereby said user can play aquatic bathe games with well defined scoring goals.

8. The aquatic toy of claim 6 wherein said upper housing further comprises an aperture so that substantially any water entering the upper housing through the inlet opening will flow, by the action of gravity, along the slanted transparent window toward the aperture, said aquatic toy further comprising a water receptacle, said water receptacle coupled to said aperture, so tee water receptacle functions as a scoring mechanism because water impairs surface visibility by progressively covering the slanted transparent window when said water receptacle becomes full, whereby said user can play aquatic battle games with well defined scoring goals.

9. The aquatic toy of claim 1 wherein said periscope housing partially has a predetermined truncated pyramidal shape as part of said tubular V-shape so that the user gets a wide angle surface view and the user does not see the inner surfaces of said lower housing as part of the surface view provided by said periscope, and wherein said periscope housing further includes a pair of handles attached thereto near the vertex thereof and a slanted transparent window, said slanted transparent window located within said periscope housing across the longest arm of the V-shape thereof so that said slanted transparent window partitions said periscope housing into an upper or surface level housing and a lower or underwater level housing, thereby the slanted transparent window prevents water shots that may enter into the upper housing from covering the whole window and from reaching said bottom reflection means, so surface visibility is not immediately impaired by the water shots, whereby said user can play aquatic battle games of suitable duration while having a panoramic surface view.

10. An aquatic toy comprising:

a toy periscope and a diving mask that can be removably connected to the toy periscope, said toy periscope including a periscope housing having a tubular V-shape structure, the length of one arm of the V-shape being different than the length of the other arm, said periscope housing having an inlet opening located at the end of the longest arm thereof, a top reflections and a bottom reflection means for reflecting light, said top and bottom reflection means being connected to the housing, said top and bottom reflection means being located within the housing, said top reflection means being located near the inlet opening, aid bottom reflection means being located near the vertex of the V-shape, and a support top connected to the housing at the end of the shortest arm of the V-shape thereof, and said diving mask including a tubular rubber body, a viewing lens, said viewing lens having a rim, and a mounting frame surrounding and secured to the rim of said lens, said mounting frame having coupling means for removably coupling said mounting frame to said support top, said support top and said coupling means having a predetermined structure so that, when a user is surface swimming horizontally while wearing toy periscope coupled to said diving mask, said user has simultaneous underwater and surface visibility, whereby said user has the freedom to use said toy periscope either connected to or disconnected from the diving mask, and said user, while so swimming, can participate in aquatic games which action takes place above the water surface and underwater.

11. The aquatic toy of claim 10 wherein sad periscope housing partially has a predetermined truncated pyramidal shape as part of said tubular V-shape so that the user gets a wide angle surface view and the user does not see the inner surfaces of said periscope housing as part of the surface view provided by said periscope.

12. The aquatic toy of claim 10 wherein said support top is made of a transparent material, said support top includes a plurality of slits, and said coupling means of the mounting frame includes a plurality of flanges and a plurality of nuts-and-bolts means for connecting said mounting frame to said support top, each flange having at least one groove, said slits and said grooves having a predetermined size, shape, and position so that, when said support top is suitably positioned in front of and parallel to said viewing lens and when said flanges are in surface contact with said support top, at least one groove is congruent to one slit, sad nuts-and-bolts means being inserted into said grooves and said slits.

13. The aquatic toy of claim 12 wherein said support top further comprises a plurality of suction cups, and said plurality of slits have a predetermined length, width, and position, so that said toy periscope can be coupled not only to said diving mask but also to many different types of diving masks.

14. The aquatic toy of claim 10 wherein said support top is made of a transparent material, and said coupling means comprises at least one pair of grooves, each pair consisting of a lower and an upper groove, the width of each groove being congruent to the thickness of the support top so that the support top slidably mates into each pair of grooves, each pair of grooves including at least one flexible locking slip, each flexible locking slip locking the support top when it is fully inserted into the grooves.

15. The aquatic toy of claim 10, wherein said periscope housing further includes a pair of handles, a slanted transparent window, and a water receptacle, said pair of handles being attached to the periscope housing near the vertex thereof, said slanted transparent window being located within said periscope housing across the longest arm of the V-shape thereof so that said slanted transparent window partitions said periscope housing into an upper or surface level housing and a lower or underwater level housing, thereby the slanted transparent window prevents water shots that may enter into the upper housing from covering the whole window and from reaching said bottom reflection means, so surface visibility is not immediately impaired by the water shots, said upper housing having an aperture so that substantally any water entering the upper housing through the inlet opening will flow, by the action of gravity, along the slanted transparent window toward the aperture, said water receptacle being coupled to said aperture, so the water receptacle functions as a scoring mechanism because water impacts surface visibility by progrsively covering the slanted transparent window when said water receptacle becomes full, whereby said user can use said aquatic toy for playing aquatic battle games with well defined scoring goals and a suitable duration.

16. The aquatic toy of claim 10, further comprising a pair of handles, a slanted transparent window, and a conduit, said pair of handles attached to said periscope housing near the vertex thereof, said slanted transparent window located within said periscope housing across the longest arm of the V-shape thereof so that said slanted transparent window partitions said periscope housing into an upper or surface level housing and a lower or underwater level housing, said conduit having first and second open ends, said first open end coupled to said upper housing, said second open end coupled to said lower housing, so the lower housing functions as a scoring mechanism because toy projectiles entering the upper housing have a finite probability of entering the lower housing where the toy projectiles accumulate on top of the bottom reflection means so that surface, visibility is progressively impaired, whereby said user can use said aquatic toy for playing aquatic battle games with well defined scoring goals.

17. An aquatic toy comprising:

a toy periscope merged to a diving mask, said toy periscope including a periscope housing having a tubular V-shape structure, the length of the V-shape along one arm thereof being different than the length along the other arm, said periscope housing having an inlet opening located at the end of the longest arm thereof, a top reflection means and a bottom reflection means for reflecting light, said top and bottom reflection means being connected to the housing, said top and bottom reflection means being located within the housing, said top reflection means being located near the inlet opening, said bottom reflection means being located near the vertex of the V-shape, a support top connected to the housing at the end of the shortest arm of the V-shape thereof, said support top having a rim, said support top being non-perforated, and a transparent window, said transparent window located within said periscope housing across the longest arm of the V-shape thereof so that said transparent window partitions said periscope housing into an upper or surface level housing and a lower or underwater level housing, said upper housing having an aperture so that any aggregate of matter entering the upper housing through said inlet opening has a non-negligible probability of exiting the upper housing through said aperture, and said diving mask including a tubular rubber body, and a mounting frame surrounding and secured to the nm of said support top, said support top being made of a transparent material so that said support top also functions as a viewing lens for the diving mask, said periscope housing being integrally made to said support top, thereby being made substantially of the same transparent material, so that said aquatic toy provides underwater and surface visibility to said user, when said user is surface swimming horizontally while wearing said aquatic toy, whereby said user, while so swimming, can participate in aquatic games which action takes place above the water surface and underwater, and said user can play aquatic battle games with well defined scoring goals when using said toy periscope connected to any scoring mechanism that can be connected thereto at said aperture.

18. The aquatic toy of claim 17, wherein said transparent window is slanted and said aquatic toy further comprises a water receptacle, said aperture connected to said water receptacle, so that water impairs surface visibility by progressively covering the slanted transparent window when said water receptacles becomes full with water that enters the upper housing through the inlet opening, thereby said water receptacle functions as a scoring mechanism and said transparent window prevents water shots entering into the upper housing from the inlet opening from immediately impairing surface visibility, whereby said user can play aquatic battle games with well defined scoring goals and a suitable duration.

19. The aquatic toy of claim 17, wherein said periscope housing further comprises a conduit, said conduit having first and second open ends, said first open end coupled to said aperture, said second open end coupled to said lower housing, so any toy projectile entering the upper housing has a finite probability of entering the lower housing, where the toy projectiles accumulate on top of the bottom reflection means, thereby the lower housing functions as a scoring mechanism, whereby said user can use said aquatic toy for playing aquatic battle games with well defined scoring goals.

20. The aquatic toy of claim 17 wherein said periscope housing partially has a predetermined truncated pyramidal shape as part of said tubular V-shape so that the user gets a wide angle surface view and the user does not see the inner surfaces of said periscope housing as part of the surface view provided by said periscope.

* * * * *